(12) United States Patent
Yamauchi

(10) Patent No.: US 12,002,230 B2
(45) Date of Patent: Jun. 4, 2024

(54) MEASUREMENT METHOD AND MEASUREMENT SYSTEM

(71) Applicant: SEIKO EPSON CORPORATION, Tokyo (JP)

(72) Inventor: Taisuke Yamauchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 276 days.

(21) Appl. No.: 17/680,440

(22) Filed: Feb. 25, 2022

(65) Prior Publication Data
US 2022/0277466 A1  Sep. 1, 2022

(30) Foreign Application Priority Data
Feb. 26, 2021 (JP) ................................ 2021-029751

(51) Int. Cl.
*G06T 7/521* (2017.01)
*G01B 11/25* (2006.01)

(52) U.S. Cl.
CPC .......... *G06T 7/521* (2017.01); *G01B 11/2513* (2013.01); *G01B 11/254* (2013.01)

(58) Field of Classification Search
CPC ... G06T 7/521; G01B 11/2513; G01B 11/254; G01B 11/245; G01B 11/2545

USPC ........................................................ 348/136
See application file for complete search history.

(56) References Cited

FOREIGN PATENT DOCUMENTS

| JP | 2006-285763 A | | 10/2006 |
|---|---|---|---|
| JP | 2014-112043 A | | 6/2014 |
| JP | 2014112043 A | * | 6/2014 |
| JP | 2015-118023 A | | 6/2015 |
| JP | 2015118023 A | * | 6/2015 |
| JP | 2016-186421 A | | 10/2016 |
| JP | 2016186421 A | * | 10/2016 |

* cited by examiner

Primary Examiner — Matthew K Kwan
(74) Attorney, Agent, or Firm — Oliff PLC

(57) ABSTRACT

A measurement method includes measuring a normal vector of a measured portion based on a first vector representing a direction from a measured portion to a principal point of a first lens, a second vector representing a direction from the measured portion to a principal point of a second lens, a third vector representing a direction from the measured portion to a principal point of a third lens, a first value representing luminance of the measured portion in a situation in which the first projector projects a fourth image via the first lens, a second value representing the luminance of the measured portion in a situation in which the second projector projects a fifth image via the second lens, and a third value representing the luminance of the measured portion in a situation in which the third projector projects a sixth image via the third lens.

10 Claims, 14 Drawing Sheets

MEASUREMENT METHOD AND MEASUREMENT SYSTEM

The present application is based on, and claims priority from JP Application Serial Number 2021-029751, filed Feb. 26, 2021, the disclosure of which is hereby incorporated by reference herein in its entirety.

BACKGROUND

1. Technical Field

The present disclosure relates to a measurement method and a measurement system.

2. Related Art

JP-A-2015-118023 discloses a normal vector extractor that extracts a normal vector necessary for the computation for carrying out an illuminance difference stereo method based on captured images generated by an imaging apparatus. The imaging apparatus has a predetermined positional relationship with four or more light sources disposed at predetermined intervals.

The normal vector extractor described in JP-A-2015-118023 requires the imaging apparatus having a predetermined positional relationship with the four or more light sources disposed at predetermined intervals. Therefore, when using the normal vector extractor described in JP-A-2015-118023, a user needs to adjust the positions of all the four or more light sources and the imaging apparatus in accordance with the predetermined positional relationship. The normal vector extractor described in JP-A-2015-118023 is therefore not very convenient.

SUMMARY

A measurement method according to an aspect of the present disclosure includes determining a first vector representing a direction from a position of a measured portion that is one of a plurality of portions of a target surface to a position of a principal point of a first lens based on position information representing positions of the plurality of portions, a first image, and a first captured image generated when a first camera captures an image of the target surface in a situation in which a first projector projects the first image onto the target surface via the first lens, determining a second vector representing a direction from the position of the measured portion to a position of a principal point of a second lens based on the position information, a second image, and a second captured image generated when the first camera captures an image of the target surface in a situation in which a second projector projects the second image onto the target surface via the second lens, determining a third vector representing a direction from the position of the measured portion to a position of a principal point of a third lens based on the position information, a third image, and a third captured image generated when the first camera captures an image of the target surface in a situation in which a third projector projects the third image onto the target surface via the third lens, and measuring a normal vector of the measured portion based on the first vector, the second vector, the third vector, a first value representing luminance of the measured portion in a situation in which the first projector projects a fourth image onto the target surface via the first lens, a second value representing the luminance of the measured portion in a situation in which the second projector projects a fifth image onto the target surface via the second lens, and a third value representing the luminance of the measured portion in a situation in which the third projector projects a sixth image onto the target surface via the third lens.

A measurement system according to another aspect of the present disclosure includes a first projector, a second projector, a third projector, a first camera, a second camera, and a processing apparatus, and the processing apparatus generates position information representing positions of a plurality of portions of a target surface based on a first captured image generated when the first camera captures an image of the target surface in a situation in which the first projector projects a first image onto the target surface via a first lens and an image generated when the second camera captures an image of the target surface in the situation in which the first projector projects the first image onto the target surface via the first lens, determines a first vector representing a direction from a position of a measured portion that is one of the plurality of portions to a position of a principal point of the first lens based on the position information, the first image, and the first captured image, determines a second vector representing a direction from the position of the measured portion to a position of a principal point of a second lens based on the position information, a second image, and a second captured image generated when the first camera captures an image of the target surface in a situation in which the second projector projects the second image onto the target surface via the second lens, determines a third vector representing a direction from the position of the measured portion to a position of a principal point of a third lens based on the position information, a third image, and a third captured image generated when the first camera captures an image of the target surface in a situation in which the third projector projects the third image onto the target surface via the third lens, and measures a normal vector of the measured portion based on the first vector, the second vector, the third vector, a first value representing luminance of the measured portion in a situation in which the first projector projects a fourth image onto the target surface via the first lens, a second value representing the luminance of the measured portion in a situation in which the second projector projects a fifth image onto the target surface via the second lens, and a third value representing the luminance of the measured portion in a situation in which the third projector projects a sixth image onto the target surface via the third lens.

A measurement system according to another aspect of the present disclosure includes a first projector, a second projector, a third projector, a first camera and a processing apparatus, and the processing apparatus generates position information representing positions of a plurality of portions of a target surface based on a first image and a first captured image generated when the first camera captures an image of the target surface in a situation in which the first projector projects the first image onto the target surface via a first lens, determines a first vector representing a direction from a position of a measured portion that is one of the plurality of portions to a position of a principal point of the first lens based on the position information, the first image, and the first captured image, determines a second vector representing a direction from the position of the measured portion to a position of a principal point of a second lens based on the position information, a second image, and a second captured image generated when the first camera captures an image of the target surface in a situation in which the second projector projects the second image onto the target surface via the second lens, determines a third vector representing a direction from the position of the measured portion to a position of a principal point of a third lens based on the position information, a third image, and a third captured image generated when the first camera captures an image of the target surface in a situation in which the third projector projects the third image onto the target surface via the third lens, and measures a normal vector of the measured portion based on the first vector, the second vector, the third vector, a first value representing luminance of the measured portion in a situation in which the first projector projects a fourth image onto the target surface via the first lens, a second value representing the luminance of the measured portion in a situation in which the second projector projects a fifth image onto the target surface via the second lens, and a third value representing the luminance of the measured portion in a situation in which the third projector projects a sixth image onto the target surface via the third lens.

DESCRIPTION OF EXEMPLARY EMBODIMENTS

A: First Embodiment

A1: Measurement System 1

Figure 1:
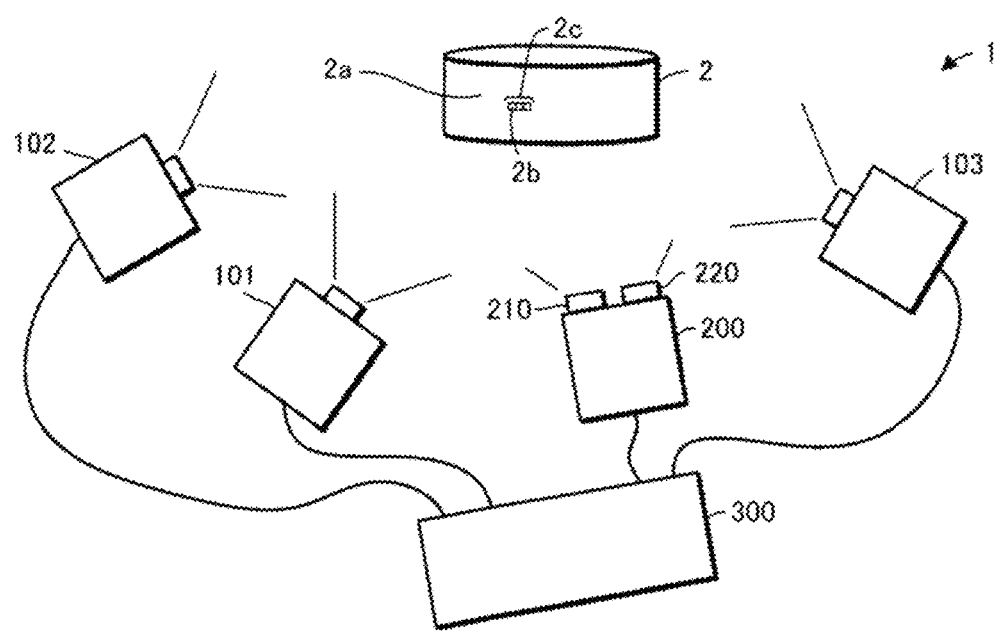
FIG. 1 shows a measurement system according to a first embodiment.

FIG. 1 shows a measurement system 1 according to a first embodiment. The measurement system 1 includes a first projector 101, a second projector 102, a third projector 103, a measurement unit 200, and an information processing apparatus 300. The measurement unit 200 includes a first camera 210 and a second camera 220. The measurement unit 200 is, for example, a stereo camera. The positional relationship among the first projector 101, the second projector 102, the third projector 103, and the measurement unit 200 is not determined in advance and can be changed as appropriate.

The measurement system 1 measures a normal vector N to a surface 2a of an object 2. Specifically, the measurement system 1 measures the normal vector N to a measured portion 2b, which is one of a plurality of portions 2c of the surface 2a. The plurality of portions 2c are not limited to three portions 2c shown in FIG. 1. For example, the plurality of portions 2c may be four or more portions 2c. The surface 2a is an example of a target surface. The measurement system 1 measures the normal vector N to the measured portion 2b by using an illuminance difference stereo method.

It is known that Expression 1 is satisfied when the reflectance of the measured portion 2b and the illuminance at the measured portion 2b are fixed over the measured portion 2b.

$$I = S\,N \qquad \text{Expression 1}$$

In Expression 1, I is an observation vector having elements being luminance values i1 to i3 observed at the measured portion 2b. S is a light source matrix that collectively describes light source vectors s1 to s3 with respect to the measured portion 2b.

Both sides of Expression 1 is multiplied by the inverse matrix $S^{-1}$ of the light source matrix S to derive Expression 2.

$$N = S^{-1} I \qquad \text{Expression 2}$$

The measurement system 1 measures the normal vector N by applying the light source vectors s1 to s3 and the luminance values i1 to i3 to Expression 2.

The measurement system 1 uses, as the light source vector s1, a first vector representing the direction from the measured portion 2b to the first projector 101. The measurement system 1 uses, as the light source vector s2, a second vector representing the direction from the measured portion 2b to the second projector 102. The measurement system uses, as the light source vector s3, a third vector representing the direction from the measured portion 2b to the third projector 103.

The measurement system 1 uses, as the luminance value i1, a luminance value measured by the first camera 210 in a situation in which the first projector 101 projects an image onto the measured portion 2b. The measurement system 1 uses, as the luminance value i2, a luminance value measured by the first camera 210 in a situation in which the second projector 102 projects an image onto the measured portion 2b. The measurement system 1 uses, as the luminance value i3, a luminance value measured by the first camera 210 in a situation in which the third projector 103 projects an image onto the measured portion 2b.

A description will be made below of the configuration and other factors of the measurement system 1, primarily of an approach to determination of the light source vectors s1 to s3 and an approach to determination of the luminance values i1 to i3.

A2: First Projector 101

Figure 2:
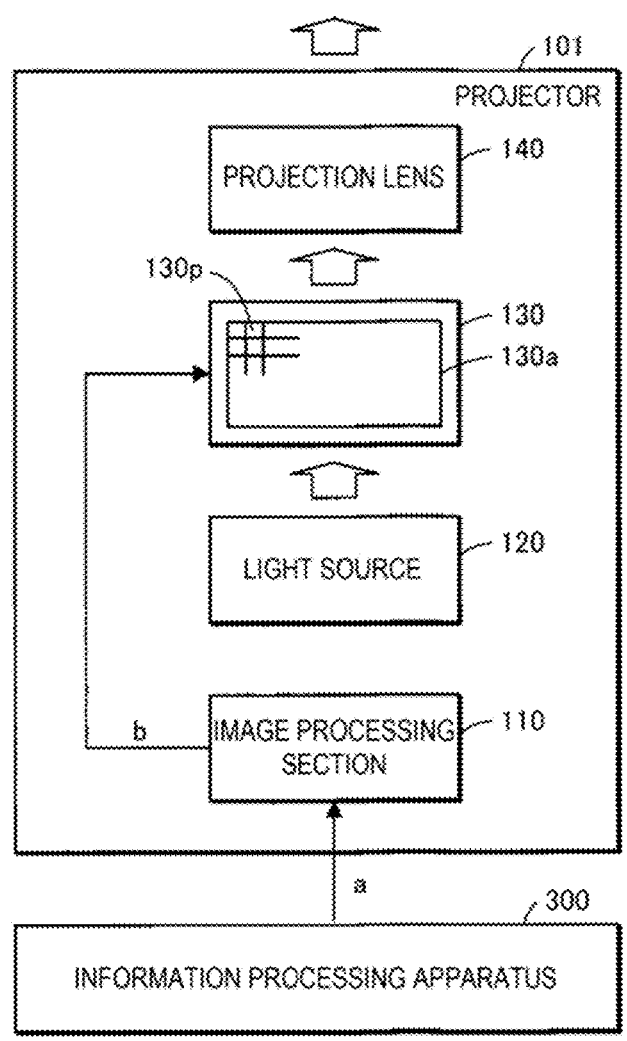
FIG. 2 shows an example of a first projector.

FIG. 2 shows an example of the first projector 101. The first projector 101 includes an image processing section 110, a light source 120, a liquid crystal light valve 130, and a projection lens 140. The projection lens 140 of the first projector 101 is an example of a first lens.

The image processing section 110 is formed of a circuit, such as an image processing circuit. The image processing circuit 110 receives image data a from an information processing apparatus 300. The image processing section 110 generates voltages b based on the image data a by performing image processing, such as gamma correction, on the image data a.

The light source 120 is an LED (light emitting diode). The light source 120 is not limited to an LED and may, for example, be a xenon lamp or a laser light source.

The liquid crystal light valve 130 is formed, for example, of a liquid crystal panel including a liquid crystal material present between a pair of transparent substrates. The liquid crystal light valve 130 has a rectangular pixel area 130a. The pixel area 130a includes a plurality of pixels 130p arranged in a matrix.

In the liquid crystal light valve 130, the voltages b based on the image data a are applied to the liquid crystal material for each of the pixels 130p. When the voltages b based on the image data a are applied to the liquid crystal material for each of the pixels 130p, the optical transmittance of the pixel 130p is set at a value based on the image data a.

The light outputted from the light source 120 is modulated by the pixel area 130a of the liquid crystal light valve 130. The liquid crystal light valve 130 is an example of a light modulator. The light modulated by the liquid crystal light valve 130 is directed toward the projection lens 140. The projection lens 140 projects the light modulated by the liquid crystal light valve 130, that is, an image onto the object 2.

A3: Second Projector 102 and Third Projector 103

The second projector 102 and the third projector 103 each have the same configuration as the first projector 101. The second projector 102 and the third projector 103 will therefore not be described in detail. The projection lens 140 of the second projector 102 is an example of a second lens. The projection lens 140 of the third projector 103 is an example of a third lens. When it is not necessary to distinguish the first projector 101 to the third projector 103 from one another, the first projector 101 to the third projector 103 are each referred to as a "projector 100".

A4: Measurement Unit 200

Figure 3:
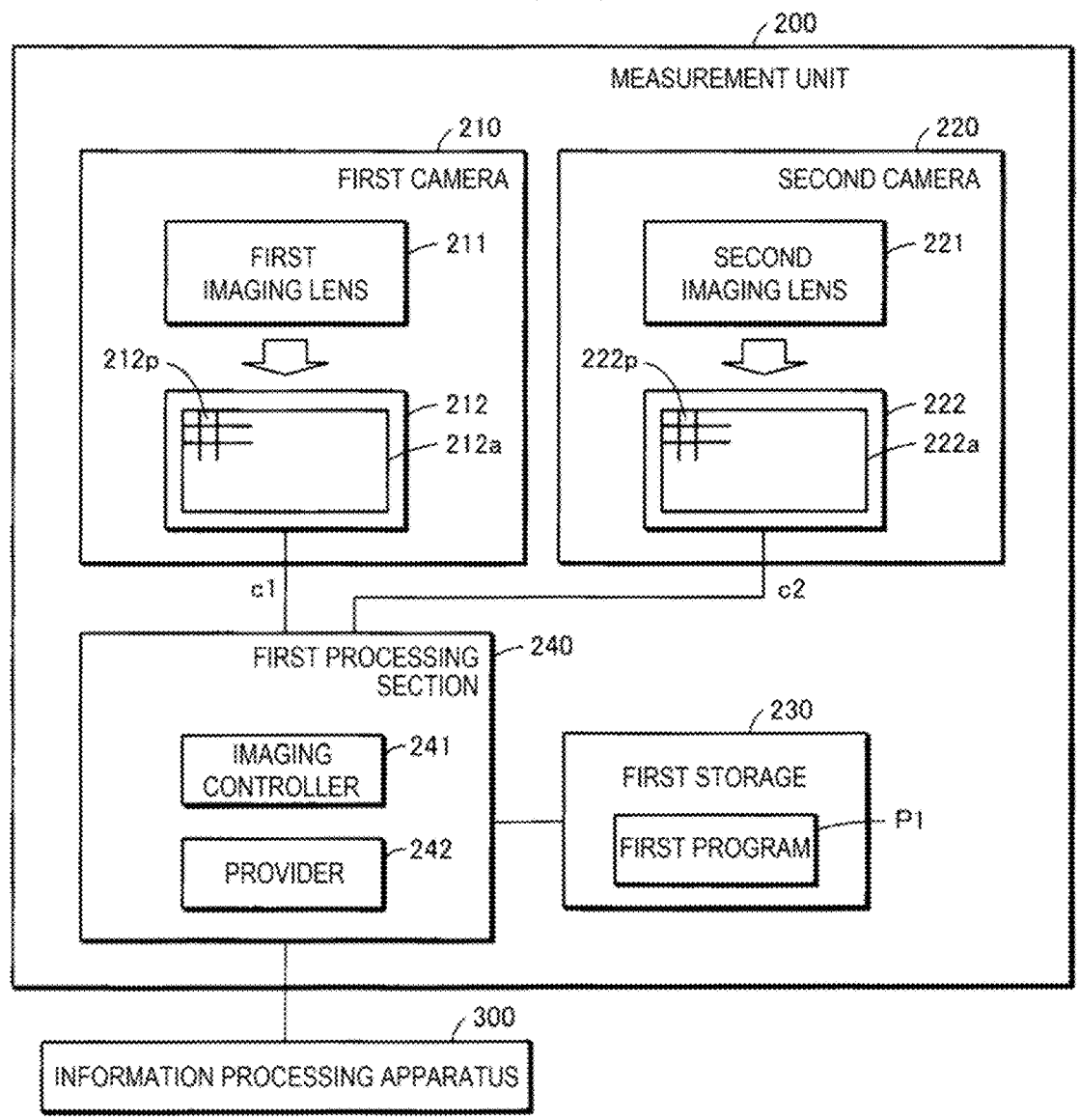
FIG. 3 shows an example of a measurement unit.

FIG. 3 shows an example of the measurement unit 200. The measurement unit 200 has a configuration different from that of each of the first projector 101, the second projector 102, and the third projector 103.

The measurement unit 200 includes a first storage 230 and a first processing section 240 in addition to the first camera 210 and the second camera 220. The position of the first camera 210 and the position of the second camera 220 differ from each other.

The first camera 210 includes a first imaging lens 211 and a first image sensor 212. The first imaging lens 211 brings an optical image of the object 2 into focus on the first image sensor 212. The first image sensor 212 is a CCD (charge coupled device) image sensor. The first image sensor 212 is not limited to a CCD image sensor and may instead, for example, be a CMOS (complementary metal oxide semiconductor) image sensor. The first image sensor 212 has a rectangular first imaging area 212a. The first imaging area 212a includes a plurality of cells 212p arranged in a matrix. The first image sensor 212 generates first captured image data c1 based on the optical image brought into focus by the first imaging lens 211.

The second camera 220 includes a second imaging lens 221 and a second image sensor 222. The second imaging lens 221 brings an optical image of the object 2 into focus on the second image sensor 222. The second image sensor 222 is a CCD image sensor. The second image sensor 222 is not limited to a CCD image sensor and may instead, for example, be a CMOS image sensor. The second image sensor 222 has a rectangular second imaging area 222a. The second imaging area 222a includes a plurality of cells 222p arranged in a matrix. The second image sensor 222 generates second captured image data c2 based on the optical image brought into focus by the second imaging lens 221.

The first storage 230 is a recording medium readable by the first processing section 240. The first storage 230 includes, for example, a nonvolatile memory and a volatile memory. The nonvolatile memory is, for example, a ROM (read only memory), an EPROM (erasable programmable read only memory), and an EEPROM (electrically erasable programmable read only memory). The volatile memory is, for example, a RAM (random access memory). The first storage 230 stores a first program P1 to be executed by the first processing section 240.

The first processing section 240 is formed of one or more CPUs (central processing units). The one or more CPUs are an example of one or more processors. The processors and the CPUs are each an example of a computer.

The first processing section 240 reads the first program P1 from the first storage 230. The first processing section 240 functions as an imaging controller 241 and a provider 242 by executing the first program P1.

The imaging controller 241 and the provider 242 may instead each be formed of a DSP (digital signal processor), an ASIC (application specific integrated circuit), a PLD (programmable logic device), an FPGA (field programmable gate array), or any other circuit.

The imaging controller 241 controls imaging performed by the first camera 210 and imaging performed by the second camera 220.

The provider 242 provides the information processing apparatus 300 with the first captured image data c1 and the second captured image data c2.

A5: Coordinate System

The first projector 101 has a panel coordinate system CS11 and a projection coordinate system CS31. The first camera 210 has a camera coordinate system CS2.

Figure 4:
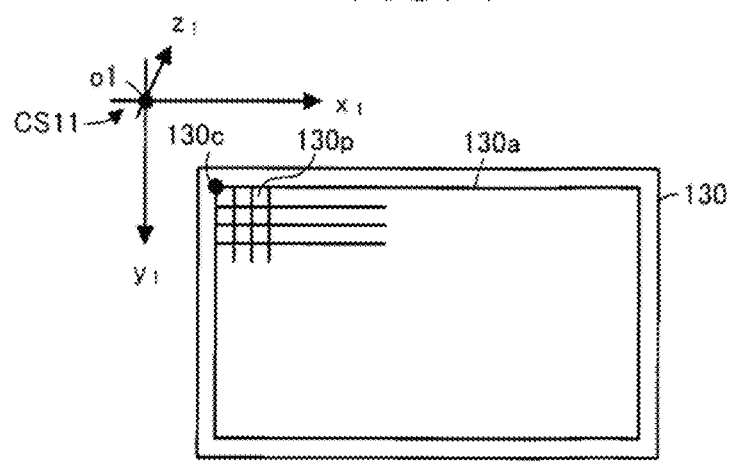
FIG. 4 shows an example of a panel coordinate system.

FIG. 4 shows an example of the panel coordinate system CS11. The panel coordinate system CS11 is a two-dimensional coordinate system. An origin o1 of the panel coordinate system CS11 is set at an upper left corner 130c of the pixel area 130a provided in the first projector 101. In FIG. 4, the origin o1 is shown at a position different from the upper left corner 130c for convenience.

The panel coordinate system CS11 is defined by axes $x_1$ and $y_1$. The axes $x_1$ and $y_1$ are perpendicular to each other. The axes $x_1$ and $y_1$ are determined in accordance with the orientation of the liquid crystal light valve 130 provided in the first projector 101. The axis $x_1$ is parallel to the horizontal direction of the liquid crystal light valve 130 provided in the first projector 101, that is, parallel to the lateral direction of the liquid crystal light valve 130 provided in the first projector 101. The axis $y_1$ is parallel to the vertical direction of the liquid crystal light valve 130 provided in the first projector 101, that is, parallel to the longitudinal direction of the liquid crystal light valve 130 provided in the first projector 101.

FIG. 4 shows an axis $z_1$ in addition to the axes $x_1$ and $y_1$. The axis $z_1$ is perpendicular to the axes $x_1$ and $y_1$. The axis $z_1$ extends along the optical axis of the projection lens 140 provided in the first projector 101.

Figure 5:
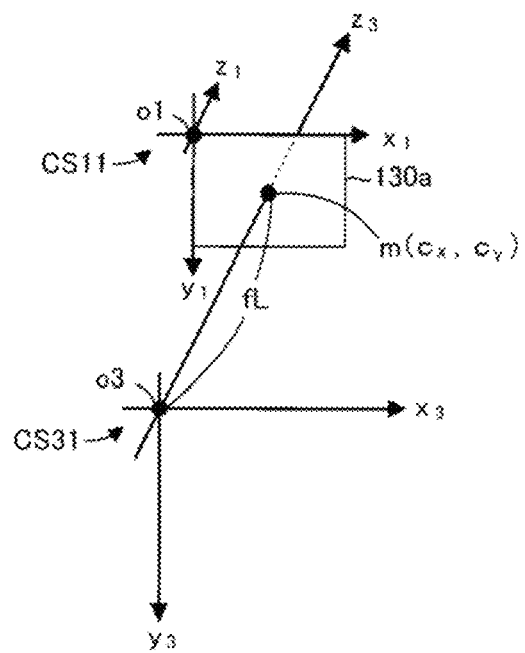
FIG. 5 shows an example of a projection coordinate system.

FIG. 5 shows an example of the projection coordinate system CS31. FIG. 5 further shows the positional relationship between the projection coordinate system CS31 and the panel coordinate system CS11.

The projection coordinate system CS31 is a three-dimensional coordinate system. An origin o3 of the projection coordinate system CS31 is set at the position of the principal point of the projection lens 140 provided in the first projector 101. The projection coordinate system CS31 is defined by axes $x_3$, $y_3$, and $z_3$. The axes $x_3$, $y_3$, and $z_3$ are perpendicular to each other. The axes $x_3$, $y_3$, and $z_3$ are determined in accordance with the orientation of the liquid crystal light valve 130 provided in the first projector 101 and the orientation of the projection lens 140 provided in the first projector 101. The axis $x_3$ is parallel to the horizontal direction of the liquid crystal light valve 130 provided in the first projector 101, as the axis $x_1$ is. The axis $y_3$ is parallel to the vertical direction of the liquid crystal light valve 130 provided in the first projector 101, as the axis $y_1$ is. The axis $z_3$ coincides with the optical axis of the projection lens 140 provided in the first projector 101. The axis $z_3$ is parallel to the axis $z_1$.

FIG. 5 shows an intersection m, where the axis $z_3$ intersects with the pixel area 130a provided in the first projector 101. The intersection m is referred to as an optical center of the pixel area 130a provided in the first projector 101. In FIG. 5, the coordinates of the intersection m in the panel coordinate system CS11 are presented as coordinates $(c_x, c_y)$. The distance between the intersection m and the origin o3 is equal to a focal length fL of the projection lens 140 provided in the first projector 101. The origin o3 coincides with the position of the principal point of the projection lens 140 provided in the first projector 101, as described above. The three-dimensional position of the principal point of the projection lens 140 provided in the first projector 101 can therefore be expressed by using the coordinates $(c_x, c_y)$ of the intersection m in the panel coordinate system CS11 and the focal length fL. Furthermore, the three-dimensional position of the principal point of the projection lens 140 provided in the first projector 101 can be expressed by the coordinates of the origin o3 of the projection coordinate system CS31.

The second projector 102 has a panel coordinate system CS12 and a projection coordinate system CS32, as the first projector 101. The panel coordinate system CS12 corresponds to the panel coordinate system CS11. The projection coordinate system CS32 corresponds to the projection coordinate system CS31. The positional relationship between the panel coordinate system CS12 and the projection coordinate system CS32 is the same as the positional relationship between the panel coordinate system CS11 and the projection coordinate system CS31. The third projector 103 has a panel coordinate system CS13 and a projection coordinate system CS33, as in the first projector 101. The panel coordinate system CS13 corresponds to the panel coordinate system CS11. The projection coordinate system CS33 corresponds to the projection coordinate system CS31. The positional relationship between the panel coordinate system CS13 and the projection coordinate system CS33 is the same as the positional relationship between the panel coordinate system CS11 and the projection coordinate system CS31.

When it is not necessary to distinguish the panel coordinate systems CS11 to CS13 from one another, the panel coordinate systems CS11 to CS13 are each referred to as a "panel coordinate system CS1". When it is not necessary to distinguish the projection coordinate systems CS31 to CS33 from one another, the projection coordinate systems CS31 to CS33 are each referred to as a "projection coordinate system CS3".

Figure 6:
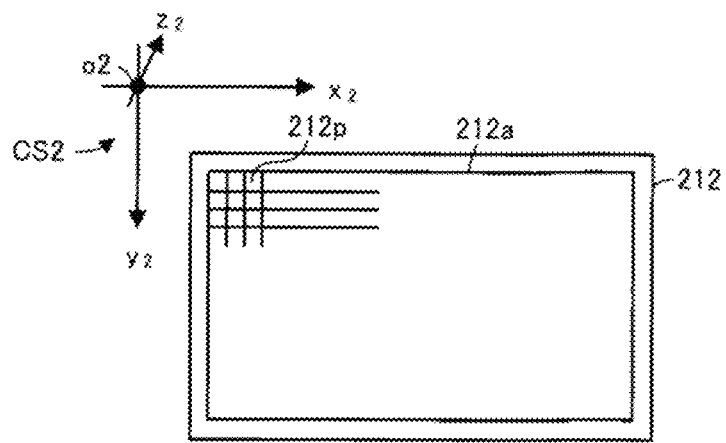
FIG. 6 shows an example of a camera coordinate system.

FIG. 6 shows an example of the camera coordinate system CS2 applied to the first camera 210. The camera coordinate system CS2 is a three-dimensional coordinate system. The camera coordinate system CS2 is a coordinate system based on the position of the first camera 210. An origin o2 of the camera coordinate system CS2 is set at the position of the principal point of the first imaging lens 211. In FIG. 6, the origin o2 is shown at a position different from the position of the principal point of the first imaging lens 211 for convenience.

The camera coordinate system CS2 is defined by axes $x_2$, $y_2$, and $z_2$. The axes $x_2$, $y_2$, and $z_3$ are perpendicular to one another. The axes $x_2$, $y_2$, and $z_2$ are determined in accordance with the orientation of the first camera 210. The axis $x_2$ is parallel to the horizontal direction of the first image sensor 212, that is, parallel to the lateral direction of the first image sensor 212. The axis $y_2$ is parallel to the vertical direction of the first image sensor 212, that is, parallel to the longitudinal direction of the first image sensor 212. The axis $z_2$ coincides with the optical axis of the first imaging lens 211.

A6: Information Processing Apparatus 300

Figure 7:
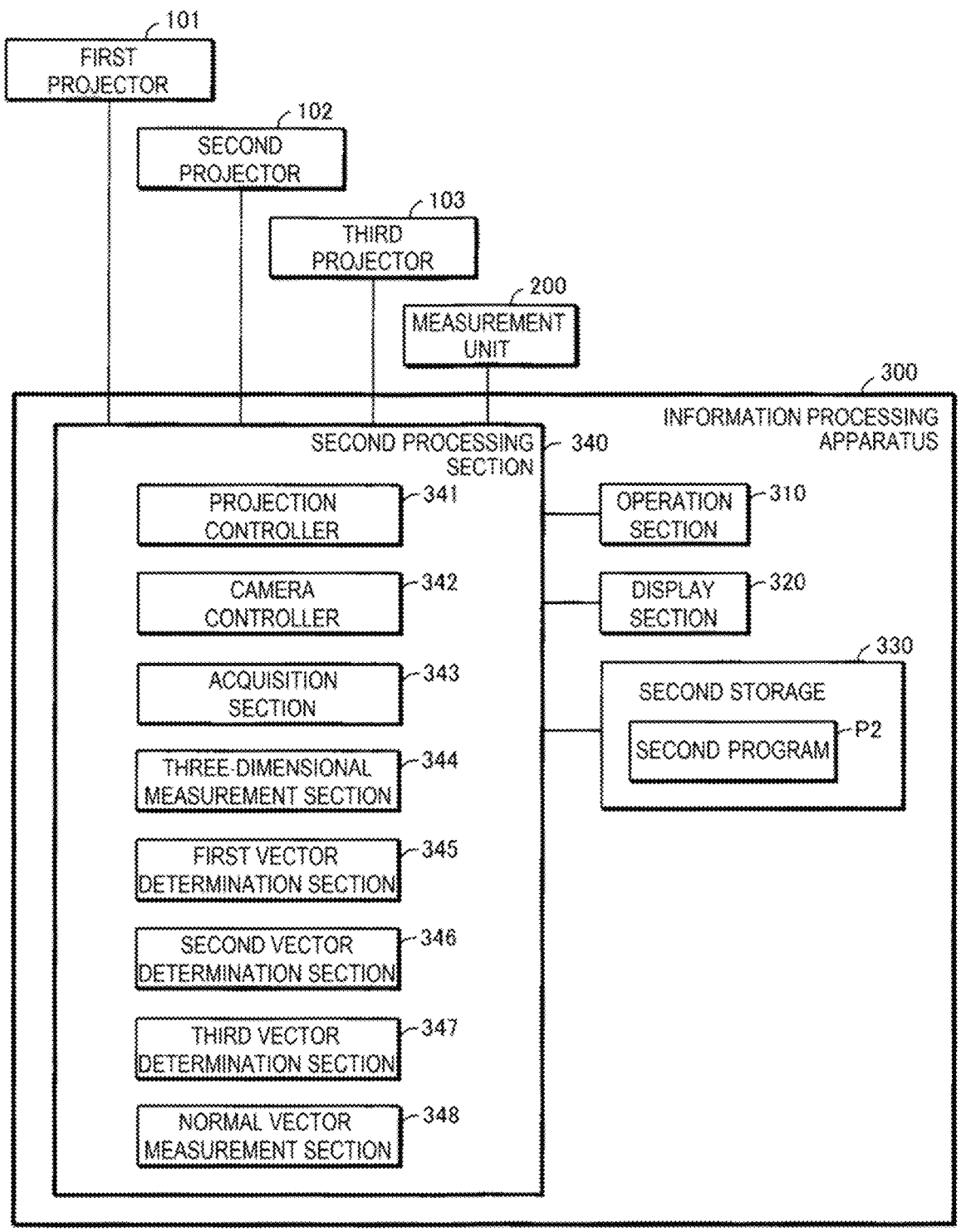
FIG. 7 shows an example of an information processing apparatus.

FIG. 7 shows an example of the information processing apparatus 300. The information processing apparatus 300 is a personal computer (PC). The information processing apparatus 300 is not limited to a PC and may, for example, be a tablet computer, a smartphone, or a measurement apparatus. The information processing apparatus 300 is an example of a processing apparatus.

The information processing apparatus 300 includes an operation section 310, a display section 320, a second storage 330, and a second processing section 340.

The operation section 310 is, for example, a keyboard, a mouse, operation buttons, operation keys, or a touch panel. The operation section 310 receives a user's input operation.

The display section 320 is a display, for example, a liquid crystal display, a plasma display, an organic EL (electro luminescence) display, or any other FPD (flat panel display). The display section 320 displays a variety of pieces of information.

The second storage 330 is a recording medium readable by the second processing section 340. The second storage 330 includes, for example, a nonvolatile memory and a volatile memory. The second storage 330 stores a second program P2 to be executed by the second processing section 340.

The second processing section 340 is formed, for example, of one or more CPUs. The second processing section 340 reads the second program P2 from the second storage 330. The second processing section 340 functions as a projection controller 341, a camera controller 342, an acquisition section 343, a three-dimensional measurement section 344, a first vector determination section 345, a second vector determination section 346, a third vector determination section 347, and a normal vector measurement section 348 by executing the second program P2.

The projection controller 341, the camera controller 342, the acquisition section 343, the three-dimensional measurement section 344, the first vector determination section 345, the second vector determination section 346, the third vector determination section 347, and the normal vector measurement section 348 may each instead be formed of a circuit, such as a DSP, an ASIC, a PLD, and an FPGA.

A7: Projection Controller 341

The projection controller 341 controls the projector 100. The projection controller 341 causes the projector 100 to project a variety of images onto the surface 2a of the object 2. The variety of images include a pattern image G1 and a measurement image G2.

Figure 8:
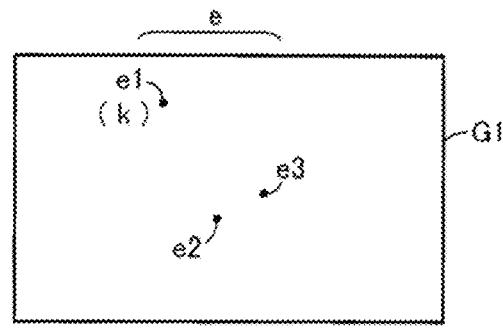
FIG. 8 shows an example of a pattern image.

FIG. 8 shows an example of the pattern image G1. The pattern image G1 is used to determine the light source vectors s1 to s3.

The pattern image G1 has a first measurement point e1, a second measurement point e2, and a third measurement point e3. When it is not necessary to distinguish the first measurement point e1 to the third measurement point e3 from one another, the first measurement point e1 to the third measurement point e3 are each referred to as a "measurement point e". The measurement point e is part of the pattern image G1. The measurement point e is also referred to as a specific point. The pattern image G1 may have four or more measurement points e.

When a plurality of pattern images G1 are used, the measurement point e may be present in each of the plurality of pattern images G1 in a manner in which the measurement point e is indistinguishable from the other portions of the pattern image G1. An example of the plurality of pattern images G1 is a plurality of phase shift images used in the phase shift method. The phase shift images will be described later.

Figure 9:
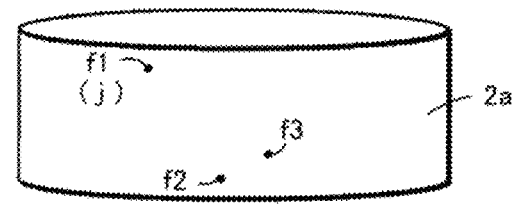
FIG. 9 shows an example of a surface onto which a pattern image is projected.

FIG. 9 shows an example of the surface 2a onto which the pattern image G1 is projected. The portion, of the surface 2a, where each of the measurement points e in the pattern image G1 is projected is referred to as a "corresponding point f". FIG. 9 shows three corresponding points f, specifically, a first corresponding point f1, a second corresponding point f2, and a third corresponding point f3. The corresponding point f is a point corresponding to the measurement point e in the pattern image G1. The first corresponding point f1 corresponds to the first measurement point e1. The second corresponding point f2 corresponds to the second measurement point e2. The third corresponding point f3 corresponds to the third measurement point e3.

The three-dimensional coordinates of the portion 2c where the corresponding point f is located are referred to as "coordinates j". The portion 2c where the corresponding point f is located is an example of a corresponding portion. The coordinates j are the coordinates, in the camera coordinate system CS2, of the portion 2c where the corresponding point f is located.

The two-dimensional coordinates of the measurement point e in the pattern image G1, specifically, the coordinates of the measurement point e in the panel coordinate system CS1 are referred to as "coordinates k". The coordinates k are coordinates based on the pattern image G1. The coordinates k are stored in advance in the second storage 330.

The projection controller 341 shown in FIG. 7 sequentially provides each of the first projector 101 to the third projector 103 with pattern image data representing the pattern image G1 to cause each of the first projector 101 to the third projector 103 to sequentially project the pattern image G1 onto the surface 2a. The pattern image data is an example of the image data a.

The projection controller 341 causes each of the first projector 101 to the third projector 103 to project the measurement image G2 in addition to the pattern image G1.

Figure 10:
FIG. 10 shows an example of a measurement image.

FIG. 10 shows an example of the measurement image G2. The measurement image G2 is used to determine the luminance values i1 to i3. The measurement image G2 is an image that is entirely white and has uniform luminance. The measurement image G2 is not limited to an image that is entirely white and has uniform luminance and may instead, for example, be an image that is entirely cream in color and has uniform luminance.

The projection controller 341 shown in FIG. 7 sequentially provides each of the first projector 101 to the third projector 103 with measurement image data representing the measurement image G2 to cause each of the first projector 101 to the third projector 103 to sequentially project the measurement image G2 onto the surface 2a. The measurement image data is an example of the image data a.

A8: Camera Controller 342

The camera controller 342 controls the measurement unit 200. The camera controller 342 causes each of the first camera 210 and the second camera 220 to capture an image of the surface 2a.

The camera controller 342 causes each of the first camera 210 and the second camera 220 to capture an image of the surface 2a in the situation in which the first projector 101 projects the pattern image G1 onto the surface 2a.

The camera controller 342 causes the first camera 210 to capture an image of the surface 2a in the situation in which the second projector 102 and the third projector 103 each project the pattern image G1 onto the surface 2a.

The camera controller 342 causes the first camera 210 to capture an image of the surface 2a in the situation in which the first projector 101 to the third projector 103 each project the measurement image G2 onto the surface 2a.

A9: Acquisition Section 343

The acquisition section 343 acquires the first captured image data c1 to acquire a captured image generated when the first camera 210 captures an image of the surface 2a. The acquisition section 343 acquires the second captured image data c2 to acquire a captured image generated when the second camera 220 captures an image of the surface 2a.

A10: Three-Dimensional Measurement Section 344

The three-dimensional measurement section 344 generates position information d1 representing the position of each of the plurality of portions 2c. The position information d1 represents the three-dimensional position of each of the portions 2c in the camera coordinate system CS2 as the position of the portion 2c. The three-dimensional measurement section 344 generates the position information d1 based on a first captured image generated when the first camera 210 captures an image of the surface 2a in a first situation in which the first projector 101 projects the pattern image G1 onto the surface 2a and a captured image generated when the second camera 220 captures an image of the surface 2a in the first situation.

A11: First Vector Determination Section 345

The first vector determination section 345 determines the first vector representing the direction from the position of the measured portion 2b, which is one of the plurality of portions 2c, to the position of the principal point of the projection lens 140 of the first projector 101.

The first vector determination section 345 acquires from the acquisition section 343 the first captured image generated when the first camera 210 captures an image of the surface 2a in the first situation in which the first projector 101 projects the pattern image G1 onto the surface 2a. The first vector determination section 345 determines the first vector based on the first captured image, the pattern image G1, and the position information d1.

A12: Second Vector Determination Section 346

The second vector determination section 346 determines the second vector representing the direction from the position of the measured portion 2b to the position of the principal point of the projection lens 140 of the second projector 102.

The second vector determination section 346 acquires from the acquisition section 343 a second captured image generated when the first camera 210 captures an image of the surface 2a in a second situation in which the second projector 102 projects the pattern image G1 onto the surface 2a. The second vector determination section 346 determines the second vector based on the second captured image, the pattern image G1, and the position information d1.

A13: Third Vector Determination Section 347

The third vector determination section 347 determines the third vector representing the direction from the position of the measured portion 2b to the position of the principal point of the projection lens 140 of the third projector 103.

The third vector determination section 347 acquires from the acquisition section 343 a third captured image generated when the first camera 210 captures an image of the surface 2a in a third situation in which the third projector 103 projects the pattern image G1 onto the surface 2a. The third vector determination section 347 determines the third vector based on the third captured image, the pattern image G1, and the position information d1.

A14: Normal Vector Measurement Section 348

The normal vector measurement section 348 measures the normal vector N to the measured portion 2b.

The normal vector measurement section 348 acquires from the acquisition section 343 as a first measured image a captured image generated when the first camera 210 captures an image of the surface 2a in the situation in which the first projector 101 projects the measurement image G2 onto the surface 2a. The normal vector measurement section 348 determines a first value representing the luminance of the measured portion 2b based on the first measured image.

The normal vector measurement section 348 acquires from the acquisition section 343 as a second measured image a captured image generated when the first camera 210 captures an image of the surface 2a in the situation in which the second projector 102 projects the measurement image G2 onto the surface 2a. The normal vector measurement section 348 determines a second value representing the luminance of the measured portion 2b based on the second measured image.

The normal vector measurement section 348 acquires from the acquisition section 343 as a third measured image a captured image generated when the first camera 210 captures an image of the surface 2a in the situation in which the third projector 103 projects the measurement image G2 onto the surface 2a. The normal vector measurement section 348 determines a third value representing the luminance of the measured portion 2b based on the third measured image.

The normal vector measurement section 348 measures the normal vector N to the measured portion 2b based on the first vector, the second vector, the third vector, the first value, the second value, and the third value. For example, the normal vector measurement section 348 determines the normal vector N to the measured portion 2b by applying the first vector, the second vector, the third vector, the first value, the second value, and the third value to Expression 2 described above, specifically, $N = S^{-1} I$.

When applying the first vector to Expression 2, the normal vector measurement section 348 uses the first vector as the light source vector s1. When applying the second vector to Expression 2, the normal vector measurement section 348 uses the second vector as the light source vector s2. When applying the third vector to Expression 2, the normal vector measurement section 348 uses the third vector as the light source vector s3. When applying the first value to Expression 2, the normal vector measurement section 348 uses the first value as the luminance value i1. When applying the second value to Expression 2, the normal vector measurement section 348 uses the second value as the luminance value i2. When applying the third value to Expression 2, the normal vector measurement section 348 uses the third value as the luminance value i3.

A15: Pattern Image G1

Figure 11:
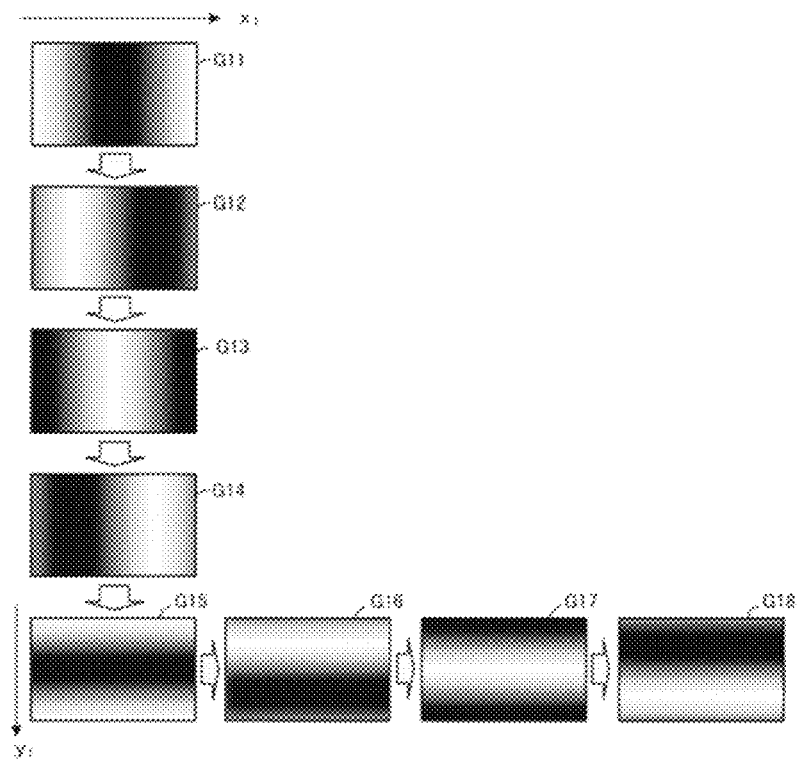
FIG. 11 shows an example of a plurality of pattern images.

FIG. 11 shows an example of the plurality of pattern images G1. The plurality of pattern images G1 include a first phase shift image G11 to an eighth phase shift image G18.

When it is not necessary to distinguish the first phase shift image G11 to the eighth phase shift image G18 from one another, the first phase shift image G11 to the eighth phase shift image G18 are each referred to as a "phase shift image G10".

When it is not necessary to distinguish the first phase shift image G11 to the fourth phase shift image G14 from one another, the first phase shift image G11 to the fourth phase shift image G14 are each referred to as a "phase shift image G10a".

When it is not necessary to distinguish the fifth phase shift image G15 to the eighth phase shift image G18 from one another, the fifth phase shift image G15 to the eighth phase shift image G18 are each referred to as a "phase shift image G10b".

The phase shift image G10a is a pattern image showing a pattern of luminance that changes in accordance with a sine wave in the direction along the axis $x_1$ of the panel coordinate system CS1. The sine wave conceptually encompasses a cosine wave. The direction along the axis $x_1$ is an example of a predetermined direction. The phase shift image G10a is used in the phase shift method.

The phase of the sine wave in the second phase shift image G12 is $\pi/2$ ahead of the phase of the sine wave in the first phase shift image G11. The phase of the sine wave in the third phase shift image G13 is $\pi$ ahead of the phase of the sine wave in the first phase shift image G11. The phase of the sine wave in the fourth phase shift image G14 is $3\pi/2$ ahead of the phase of the sine wave in the first phase shift image G11.

Figure 12:
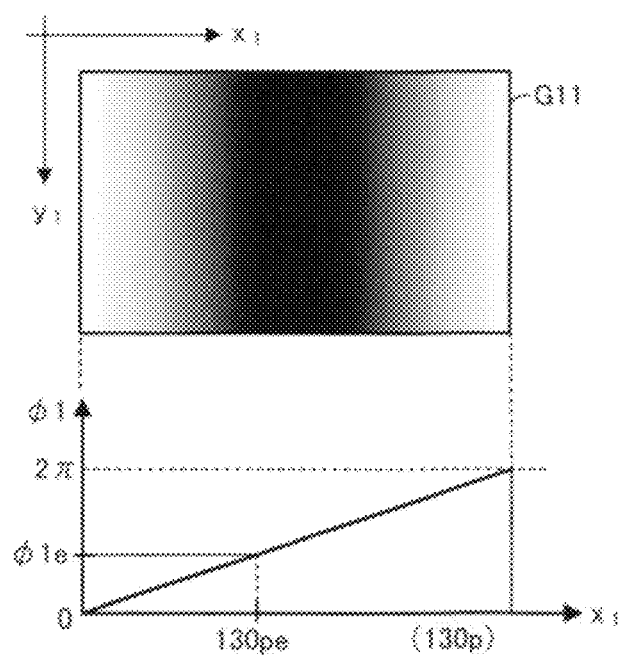
FIG. 12 shows the relationship between a pixel and a phase.

FIG. 12 shows the relationship between the pixels 130p arranged in the direction along the axis $x_1$ in the liquid crystal light valve 130 and a phase $\phi 1$ of the sine wave according to the luminance of each of the pixels 130p in the situation in which the projector 100 projects the first phase shift image G11.

FIG. 12 shows the pixel located at the measurement point e out of the plurality of pixels 130p provided in the liquid crystal light valve 130 as a "pixel 130pe".

In the first phase shift image G11, each of the pixels 130p of the liquid crystal light valve 130 corresponds to the phase $\phi 1$ in a one-to-one correspondence in the direction along the axis $x_1$, as shown in FIG. 12. Therefore, in the first phase shift image G11, a phase $\phi 1e$ corresponding to pixel 130pe is uniquely determined in the direction along the axis $x_1$. FIG. 12 shows only the pixel 130p located at the first measurement point e1 as the pixel 130pe for simplicity of description.

Consider a case where any cell in the first image sensor 212 is referred to as a "cell 212pi", and it is known that a phase $\phi 2$ of the sine wave according to the luminance observed by the cell 212pi in the situation in which the first phase shift image G11 is projected is determined by Expression 3.

$$\phi 2 = \tan^{-1}\{(I_2 - I_4)/(I_1 - I_3)\} \qquad \text{Expression 3}$$

$I_1$ represents the luminance observed by the cell 212pi in the situation in which the first phase shift image G11 is projected.

$I_2$ represents the luminance observed by the cell 212pi in the situation in which the second phase shift image G12 is projected.

$I_3$ represents the luminance observed by the cell 212*pi* in the situation in which the third phase shift image G13 is projected.

$I_4$ represents the luminance observed by the cell 212*pi* in the situation in which the fourth phase shift image G14 is projected.

The pixel 130*pe* shown in FIG. 12 is the pixel located at the measurement point e out of the plurality of pixels 130*p* provided in liquid crystal light valve 130. Out of the plurality of cells 212*p* provided in the first image sensor 212, the cell that observes the corresponding point f corresponding to the measurement point e is referred to as a "cell 212*pt*". The phase φ2 according to the luminance observed by the cell 212*pt* has the same value of the phase φ1*e* according to the luminance of the pixel 130*pe*.

The phase shift image G10*a* shows luminance changes according to the sine wave in the direction along the axis $x_1$. Therefore, when the phase shift image G10*a* is used, a cell group 212*px* of cells having a coordinate $x_{2f}$ corresponding to a coordinates $x_{1f}$ of the pixel 130*pe* can be determined from the plurality of cells 212*p*. The coordinate $x_{1f}$ is the coordinate, on the axis $x_1$, of the pixel 130*pe* located at the measurement point e. The coordinate $x_{2f}$ is the coordinate, on the axis $x_2$, of the cell 212*pt* that observes the corresponding point f. The cell 212*pt* that observes the corresponding point f is any of the cells in the cell group 212*px*.

The description will be resumed with reference to FIG. 11. The phase shift image G10*b*, which is any of the fifth phase shift image G15 to the eighth phase shift image G18, is a pattern image showing a pattern of luminance that changes in accordance with a sine wave in the direction along the axis $y_1$ of the panel coordinate system CS1. The direction along the axis $y_1$ is another example of the predetermined direction. The phase shift image G10*b* is used in the phase shift method.

The phase of the sine wave in the sixth phase shift image G16 is π/2 ahead of the phase of the sine wave in the fifth phase shift image G15. The phase of the sine wave in the seventh phase shift image G17 is π ahead of the phase of the sine wave in the fifth phase shift image G15. The phase of the sine wave in the eighth phase shift image G18 is 3π/2 ahead of the phase of the sine wave in the fifth phase shift image G15.

The phase shift image G10*b* shows luminance changes according to the sine wave in the direction along the axis $y_1$. Therefore, when the phase shift image G10*b* is used, a cell group 212*py* of cells having a coordinate $y_{2f}$ corresponding to a coordinates $y_{1f}$ of the pixel 130*pe* can be determined from the plurality of cells 212*p*. The coordinate $y_{1f}$ is the coordinate, on the axis $y_1$, of the pixel 130*pe* located at the measurement point e. The coordinate $y_{2f}$ is the coordinate, on the axis $y_2$, of the cell 212*pt* that observes the corresponding point f. The cell 212*pt* that observes the corresponding point f is any of the cells in the cell group 212*py*.

The cell 212*pt* that observes the corresponding point f is therefore a cell that belongs to both the cell group 212*px* and the cell group 212*py*. Therefore, out of the plurality of cells 212*p*, a cell that belongs to both the cell group 212*px* and the cell group 212*py* can be determined as the cell 212*pt* that observes the corresponding point f. The cell 222*pt* that observes the corresponding point f out of the plurality of cells 222*p* provided in the second image sensor 222 can be determined in the same manner in which the cell 212*pt* that observes the corresponding point f is determined. The cell 212*pt* that observes the corresponding point f means the cell 212*pt* that observes the portion 2*c* where the corresponding point f is located. The cell 222*pt* that observes the corresponding point f means the cell 222*pt* that observes the portion 2*c* where the corresponding point f is located.

A16: Description of Action

Figure 13:
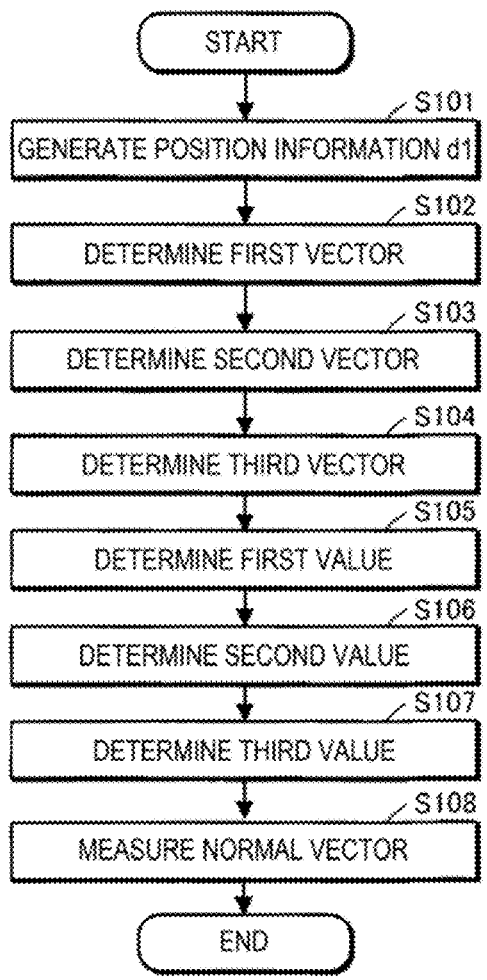
FIG. 13 describes an overview of the action of the measurement system.

FIG. 13 describes an overview of the action of the measurement system 1.

In step S101, the three-dimensional measurement section 344 generates the position information d1. Subsequently, in step S102, the first vector determination section 345 determines the first vector. Subsequently, in step S103, the second vector determination section 346 determines the second vector. Subsequently, in step S104, the third vector determination section 347 determines the third vector. Subsequently, in step S105, the normal vector measurement section 348 determines the first value. Subsequently, in step S106, the normal vector measurement section 348 determines the second value. Subsequently, in step S107, the normal vector measurement section 348 determines the third value. Subsequently, in step S108, the normal vector measurement section 348 measures the normal vector N to the measured portion 2*b* based on the first vector, the second vector, the third vector, the first value, the second value, and the third value.

Figure 14:
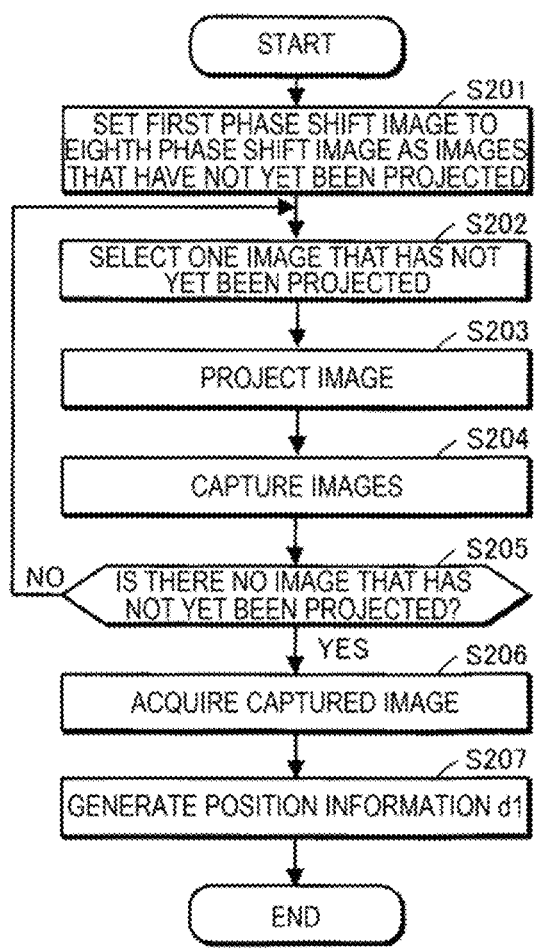
FIG. 14 shows an example of step S101 shown in FIG. 13.

FIG. 14 shows an example of step S101 shown in FIG. 13. The user inputs a start instruction to the operation section 310 by operating the operation section 310. Having received the start instruction, the operation section 310 provides the second processing section 340 with the start instruction.

When the second processing section 340 receives the start instruction, the projection controller 341 sets in step S201 the first phase shift image G11 to the eighth phase shift image G18 as images that have not yet been projected.

Subsequently, in step S202, the projection controller 341 selects one image that has not yet been projected from the first phase shift image G11 to the eighth phase shift image G18. The projection controller 341 selects each of the images that have not yet been projected in the following order: the first phase shift image G11; the second phase shift image G12; the third phase shift image G13; the fourth phase shift image G14; the fifth phase shift image G15; the sixth phase shift image G16; the seventh phase shift image G17; and the eighth phase shift image G18. The order in accordance with which the images that have not been projected are each selected is not limited to the following order and can be changed as appropriate: the first phase shift image G11; the second phase shift image G12; the third phase shift image G13; the fourth phase shift image G14; the fifth phase shift image G15; the sixth phase shift image G16; the seventh phase shift image G17; and the eighth phase shift image G18.

The projection controller 341 then provides the first projector 101 with the image data a representing the image selected in step S202. When the image data a is stored in the second storage 330, the projection controller 341 reads the image data a from the second storage 330. The projection controller 341 provides the first projector 101 with the image data a read from the second storage 330. The projection controller 341 may generate the image data a based on the second program P2. In this case, the projection controller 341 provides the first projector 101 with the generated image data a.

The projection controller 341 subsequently changes the setting of the image selected in step S202 from the image that has not yet been projected to the image that has been projected.

Subsequently, in step S203, the first projector 101 projects the image indicated by the image data a and provided from the projection controller 341 onto the surface 2*a*.

Subsequently, in step S204, the camera controller 342 causes the first camera 210 and the second camera 220 to capture images of the surface 2a onto which the image has been projected.

For example, the camera controller 342 provides the imaging controller 241 of the measurement unit 200 with a first imaging instruction that instructs imaging using the first camera 210 and the second camera 220. In response to the first imaging instruction, the imaging controller 241 causes the first camera 210 and the second camera 220 to capture images of the surface 2a onto which the image has been projected. The first camera 210 captures an image of the surface 2a onto which the image has been projected to generate the first captured image data c1 representing the captured image. The second camera 220 captures an image of the surface 2a onto which the image has been projected to generate the second captured image data c2 representing the captured image.

Subsequently, in step S205, the projection controller 341 returns to the process in step S202 when any of the first phase shift image G11 to the eighth phase shift image G18 is an image set as an image that has not yet been projected. The first phase shift image G11 to the eighth phase shift image G18 are thus projected onto the surface 2a individually by the first projector 101.

When none of the first phase shift image G11 to the eighth phase shift image G18 is an image set as an image that has not yet been projected in step S205, the acquisition section 343 acquires in step S206 the captured image generated in step S204.

In step S206, the acquisition section 343 provides the provider 242 of the measurement unit 200 with a first provision instruction that instructs provision of captured images associated with the phase shift images. In response to the first provision instruction, the provider 242 provides the information processing apparatus 300 with the first captured image data c1 generated by imaging of each of the first phase shift image G11 to the eighth phase shift image G18 and the second captured image data c2 generated by imaging of each of the first phase shift image G11 to the eighth phase shift image G18.

The acquisition section 343 acquires the captured images generated in step S204 by acquiring from the provider 242 the first captured image data c1 generated by imaging of each of the first phase shift image G11 to the eighth phase shift image G18 and the second captured image data c2 generated by imaging of each of the first phase shift image G11 to the eighth phase shift image G18.

Subsequently, in step S207, the three-dimensional measurement section 344 generates the position information d1 representing the position of each of the plurality of portions 2c expressed in the form of three-dimensional coordinates in the camera coordinate system CS2.

In the measurement system 1, the plurality of portions 2c are so set that one portion 2c is observed by one cell 212p and one cell 222p. One part 2c is sized so as to be observed by one cell 212p and one cell 222p.

In step S207, the three-dimensional measurement section 344 first determines a pair of a cell 212p and a cell 222p as a first corresponding pair for each of the pixels 130p of the liquid crystal light valve 130, the cell 212p observing the portion 2c onto which an image indicated by the pixel 130p is projected, the cell 222p observing the portion 2c onto which the image indicated by the pixel 130p is projected. For example, the three-dimensional measurement section 344 determines the first corresponding pairs by using the phase shift method. The first corresponding pairs each correspond to the pixels 130p indicating the images observed by the first corresponding pair.

Subsequently, the three-dimensional measurement section 344 three-dimensionally measures the portions 2c by using the first corresponding pairs. For example, the three-dimensional measurement section 344 calculates for each of the first corresponding pairs, the distance from the portion 2c observed by the first corresponding pair to the first camera 210 based on triangulation using the positions of the two cells that form the first corresponding pair.

The three-dimensional measurement section 344 uses the positions of the portions 2c in the camera coordinate system CS2 as the result of the three-dimensional measurement of the portions 2c. Out of the three-dimensional coordinates of each of the portions 2c in the camera coordinate system CS2, the three-dimensional measurement section 344 uses as the coordinate based on the axis $x_2$ the coordinate, based on the axis $x_2$, of the cell 212p that observes the portion 2c. Out of the three-dimensional coordinates of each of the portions 2c in the camera coordinate system CS2, the three-dimensional measurement section 344 uses as the coordinate based on the axis $y_2$ the coordinate, based on the axis $y_2$, of the cell 212pt that observes the portion 2c. Out of the three-dimensional coordinates of each of the portions 2c in the camera coordinate system CS2, the three-dimensional measurement section 344 uses as the coordinate based on the axis $z_2$ a value representing the distance from the portion 2c to the first camera 210.

The three-dimensional measurement section 344 generates the position information d1 by using the positions of the portions 2c in the camera coordinate system CS2.

Figure 15:
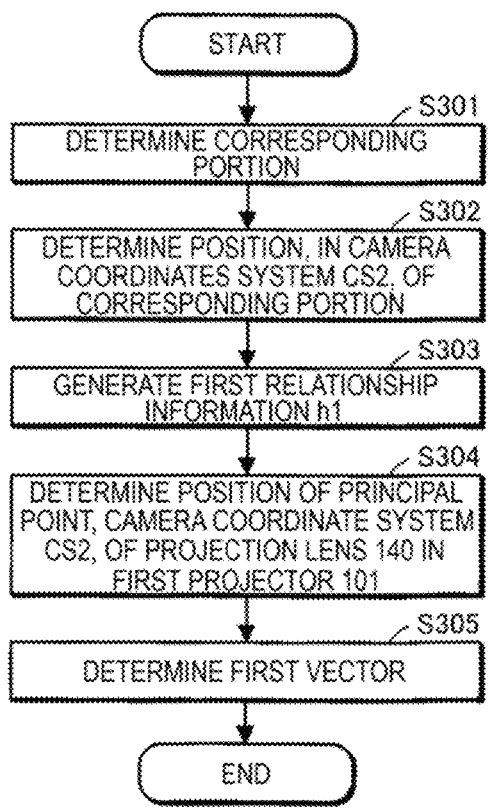
FIG. 15 shows an example of step S102 shown in FIG. 13.

FIG. 15 shows an example of step S102 shown in FIG. 13. In step S301, the first vector determination section 345 acquires from the acquisition section 343 the first captured image generated when the first camera 210 captures an image of the surface 2a in the situation in which the first projector 101 projects the first phase shift image G11 to the eighth phase shift image G18, which are each the pattern image G1, onto the surface 2a. The first vector determination section 345 subsequently determines the corresponding portion where the measurement point e is located from the plurality of portions 2c based on the pattern image G1 and the first captured image.

For example, the first vector determination section 345 determines, for each measurement point e, the cell 212p that observes the corresponding point f by using the phase shift method. The first vector determination section 345 subsequently determines, for each measurement point e, the first corresponding pair including the cell 212p that observes the corresponding point f from the plurality of first corresponding pairs. The first vector determination section 345 subsequently determines the portion 2c observed by the determined first corresponding pair as the corresponding portion where the measurement point e is located.

Subsequently, in step S302, the first vector determination section 345 determines, for each measurement point e, the position of the corresponding portion in the camera coordinate system CS2 by referring to the position information d1.

For example, the first vector determination section 345 determines, for each measurement point e, the three-dimensional coordinates of the corresponding portion, out of the three-dimensional coordinates of the plurality of portions 2c indicated by the position information d1, as the position of the corresponding portion in the camera coordinate system CS2.

Subsequently, in step S303, the first vector determination section 345 generates first relationship information h1 representing the relationship between the position of the principal point of the projection lens 140 provided in the first projector 101 and the position of the first camera 210.

In step S303, the first vector determination section 345 generates the first relationship information h1 based on the position of the measurement point e in the pattern image G1 and the position of the corresponding portion in the camera coordinate system CS2.

Since the position of the measurement point e in the pattern image G1, that is, the two-dimensional coordinates k are stored in the second storage 330, the first vector determination section 345 acquires the coordinates k from the second storage 330.

The first vector determination section 345 generates the first relationship information h1 by solving a PnP (Perspective n Points) problem by using a pair of the three-dimensional coordinates j and the two-dimensional coordinates k for each measurement point e. The pair of the coordinates j and the coordinates k is hereinafter referred to as a "coordinate pair".

For example, the first vector determination section 345 solves the PnP problem by substituting the coordinate pair into Expression 4 for each measurement point e. Expression 4 is also referred to as a perspective projection conversion expression.

$$s\begin{bmatrix}u\\v\\1\end{bmatrix} = \begin{bmatrix}f_x & 0 & c_x\\0 & f_y & c_y\\0 & 0 & 1\end{bmatrix}\begin{bmatrix}r_{11} & r_{12} & r_{13} & t_1\\r_{21} & r_{22} & r_{23} & t_2\\r_{31} & r_{32} & r_{33} & t_3\end{bmatrix}\begin{bmatrix}X\\Y\\Z\\1\end{bmatrix}$$ Expression 4 where $$\begin{bmatrix}f_x & 0 & c_x\\0 & f_y & c_y\\0 & 0 & 1\end{bmatrix}$$

is an internal parameter matrix A1 of the projection lens 140.

$$\begin{bmatrix}r_{11} & r_{12} & r_{13}\\r_{21} & r_{22} & r_{23}\\r_{31} & r_{32} & r_{33}\end{bmatrix}$$

is a rotation matrix R1.

$$\begin{bmatrix}t_1\\t_2\\t_3\end{bmatrix}$$

is a translation matrix T1.

The internal parameter matrix A1 represents the relationship between the panel coordinate system CS1 and the projection coordinate system CS3. The rotation matrix R1 and the translation matrix T1 represent the relationship between the projection coordinate system CS3 and the camera coordinate system CS2.

The coordinates (X, Y, Z) represent the three-dimensional coordinates of the camera coordinate system CS2, for example, the coordinates j.

The coordinates (u, v) represent the two-dimensional coordinates of the panel coordinate system CS1, for example, the coordinates k.

The expression s is a scaling factor for achieving "1" in (u, v, 1). s=Z is satisfied.

The coordinates ($c_x$, $c_y$) are the coordinates of the intersection m shown in FIG. 5 in the panel coordinate system CS1.

The parameters $f_x$ and $f_y$ represent the focal length of the projection lens 140.

The parameters $f_x$ and $f_y$ are each expressed by a value that is an integer multiple of one pixel 130p.

In other words, $f_x$ and $f_y$ represent the focal length of the projection lens 140 expressed in pixel.

The parameter $f_x$ is the focal length of the projection lens 140 expressed in a unit based on the length of a pixel 130p in the direction of the axis $x_1$.

The parameter $f_y$ is the focal length of the projection lens 140 expressed in a unit based on the length of a pixel 130p in the direction of the axis $y_1$.

The first vector determination section 345 generates a plurality of equations by substituting the coordinate pair into Expression 4 for each measurement point e. The first vector determination section 345 determines the rotation matrix R1, the translation matrix T1, and the internal parameter matrix A1 by solving the plurality of equations.

The rotation matrix R1 and the translation matrix T1 are examples of the first relationship information h1 representing the positional relationship between the first projector 101 and the first camera 210. The rotation matrix R1 and translation matrix T1 are external parameters of the first projector 101. The external parameters of the first projector 101 are an example of the first relationship information h1.

The internal parameter matrix A1 is an example of characteristic information representing the characteristics of the projection lens 140. The internal parameter matrix A1 represents internal parameters of the projection lens 140. The internal parameters of the projection lens 140 mean internal parameters of the first projector 101.

When the internal parameter matrix A1 is known, the first vector determination section 345 may determine the rotation matrix R1 and the translation matrix T1 by solving the plurality of equations. In this case, the first vector determination section 345 can determine the rotation matrix R1 and the translation matrix T1 by using at least three coordinate pairs. The first vector determination section 345 can determine the rotation matrix R1 and the translation matrix T1 as one solution by using six or more coordinate pairs.

The coordinates indicated by a coordinate pair are likely to contain errors. Therefore, the larger the number of coordinate pairs to be substituted into Expression 4, the more accurate the rotation matrix R1 and translation matrix T1. It is therefore desirable that the first vector determination section 345 determines the rotation matrix R1 and the translation matrix T1 by using a larger number of coordinate pairs.

When the internal parameter matrix A1 is unknown, the first vector determination section 345 determines the internal parameter matrix A1 in addition to the rotation matrix R1 and the translation matrix T1 by using Expression 4.

The internal parameters of the projection lens 140 change over time. The internal parameters of the projection lens 140 are likely to change due to the heat radiated by the light source 120, which is not part of the first camera 210. The known internal parameter matrix A1 may therefore differ from the actual internal parameters of the projection lens 140. When the internal parameter matrix A1 differs from the actual internal parameters of the projection lens 140, the accuracy of each of the rotation matrix R1 and the translation matrix T1 decreases, as will be understood from Expression 4. Therefore, even when the internal parameter matrix A1 is known, it is desirable that the first vector determination section 345 determines the internal parameter matrix A1 in addition to the rotation matrix R1 and the translation matrix T1 by using Expression 4.

To calculate the rotation matrix R1, the translation matrix T1, and the internal parameter matrix A1 by using Expression 4, 10 coordinate pairs are required at the minimum. The first vector determination section 345 therefore determines the rotation matrix R1, the translation matrix T1, and the internal parameter matrix A1 by using 10 or more coordinate pairs.

The coordinates indicated by a coordinate pair are likely to contain errors, as described above. Therefore, the larger the number of coordinate pairs to be substituted into Expression 4, the more accurate the rotation matrix R1, the translation matrix T1, and the internal parameter matrix A1. It is therefore desirable that the first vector determination section 345 determines the rotation matrix R1, the translation matrix T1, and the internal parameter matrix A1 by using a larger number of coordinate pairs.

Subsequently, in step S304, the first vector determination section 345 determines the position, in the camera coordinate system CS2, of the principal point of the projection lens 140 provided in the first projector 101 based on the first relationship information h1.

For example, the first vector determination section 345 uses the rotation matrix R1 and the translation matrix T1 to determine the position of the principal point, in the camera coordinate system CS2, of the projection lens 140 provided in the first projector 101 based on the position of the principal point, in the projection coordinate system CS31, of the projection lens 140 provided in the first projector 101. The first vector determination section 345 uses the position of the origin o3 of the projection coordinate system CS31 as the position of the principal point, in the projection coordinate system CS31, of the projection lens 140 provided in the first projector 101.

For example, the first vector determination section 345 uses the relationship expressed by Expression 5 to convert the position of the principal point, in the projection coordinate system CS31, of the projection lens 140 provided in the first projector 101 into the position of the principal point, in the camera coordinate system CS2, of the projection lens 140 provided in the first projector 101. Note that Expression 5 is equivalent to Expression 4.

$$\begin{bmatrix} x \\ y \\ z \end{bmatrix} = R1 \begin{bmatrix} X \\ Y \\ Z \end{bmatrix} + T1 \quad \text{Expression 5}$$

$$x' = x/z$$

$$y' = y/z$$

$$x'' = x'(1 + k_1 r^2 + k_2 r^4 + k_3 r^6) + 2p_1 x' y' + p_2 (r^2 + 2x'^2)$$

$$y'' = y'(1 + k_1 r^2 + k_2 r^4 + k_3 r^6) + p_1 (r^2 + 2y'^2) + 2p_2 x' y'$$

where $$r^2 = x'^2 + y'^2$$

$$u = f_x * x'' + c_x$$

$$v = f_y * y'' + c_y$$

The parameters $k_1$, $k_2$, and $k_3$ are each a radial distortion coefficient of the projection lens 140.

The parameters $p_1$ and $p_2$ are each a circumferential distortion coefficient of the projection lens 140.

The distortion coefficients belong to the internal parameters of the projection lens 140.

Expression 5 shows the relationship between the three-dimensional coordinates (x, y, z) in the projection coordinate system CS31 and the three-dimensional coordinates (X, Y, Z) in the camera coordinate system CS2. For example, the first vector determination section 345 determines the position (X, Y, Z) of the principal point, in the camera coordinate system CS2, of the projection lens 140 provided in the first projector 101 by transforming the expression derived by inputting the coordinates (0, 0, 0) of the origin o3 of the projection coordinate system. CS31 into (x, y, z) in Expression 5.

Subsequently, in step S305, the first vector determination section 345 determines the first vector. The first vector determination section 345 determines as the first vector a vector representing the direction from the position, in the camera coordinate system CS2, of the measured portion 2b to the position of the principal point, in the camera coordinate system CS2, of the projection lens 140 provided in the first projector 101. The first vector is, for example, a unit vector representing the direction from the position, in the camera coordinate system CS2, of the measured portion 2b to the position of the principal point, in the camera coordinate system CS2, of the projection lens 140 provided in the first projector 101.

Figure 16:
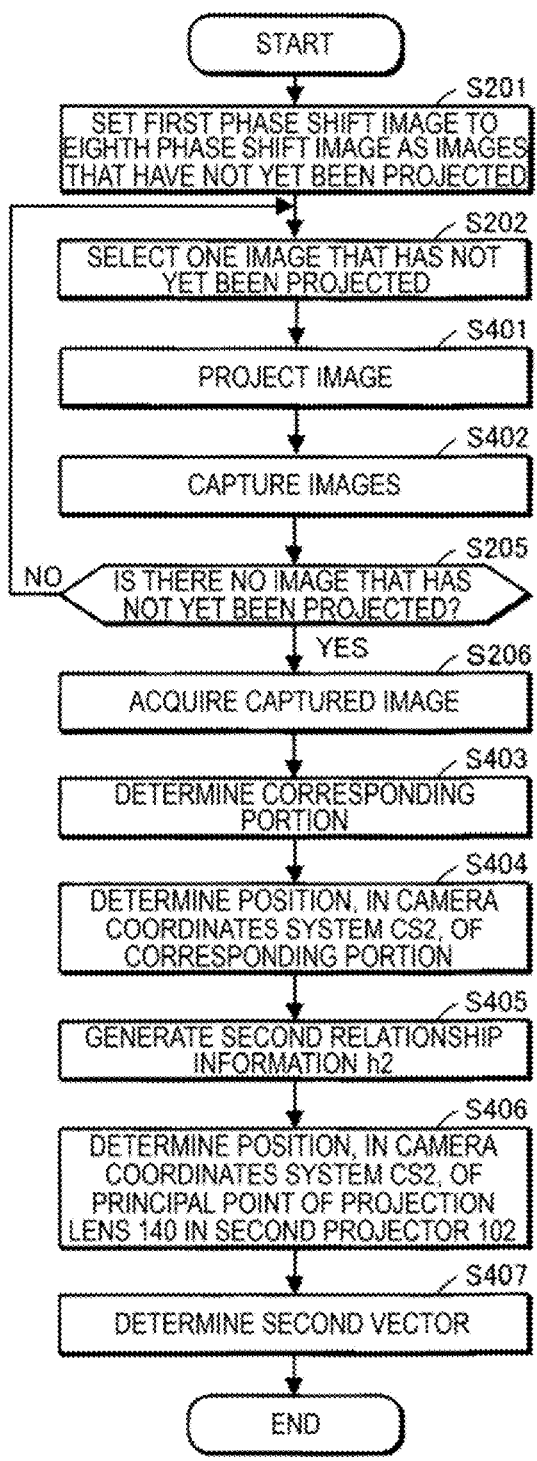
FIG. 16 shows an example of step S103 shown in FIG. 13.

FIG. 16 shows an example of step S103 shown in FIG. 13. In FIG. 16, the same processes as those shown in FIG. 14 have the same reference characters. The following description will be made primarily of the processes in FIG. 16 that differ from those shown in FIG. 14.

When steps S201 and S202 are completed, the projection controller 341 provides in step S401 the second projector 102 with the image data a representing the image selected in step S202. The projection controller 341 subsequently changes the setting of the image selected in step S202 from the image that has not yet been projected to the image that has been projected. The second projector 102 projects an image indicated by the image data a provided from the projection controller 341 onto the surface 2a.

Subsequently, in step S402, the camera controller 342 provides the imaging controller 241 of the measurement unit 200 with a second imaging instruction that instructs imaging using the first camera 210. In response to the second imaging instruction, the imaging controller 241 causes the first camera 210 to capture an image of the surface 2a onto which the image has been projected from the second projector 102. The first camera 210 captures an image of the surface 2a onto which the image has been projected from the second projector 102 to generate the first captured image data c1 representing the captured image. Steps S205 and S206 are subsequently executed.

Subsequently, in step S403, the second vector determination section 346 acquires from the acquisition section 343 the second captured image generated when the first camera 210 captures an image of the surface 2a in the situation in which the second projector 102 projects the pattern image G1 onto the surface 2a. The second vector determination section 346 subsequently determines the corresponding portion where the measurement point e is located out of the plurality of portions 2c based on the pattern image G1 and the second captured image. The approach in accordance with which the second vector determination section 346 determines the corresponding portion where the measurement point e is located based on the pattern image G1 and the second captured image is the same as the approach in accordance with which the first vector determination section 345 determines the corresponding portion where the measurement point e is located based on the pattern image G1 and the first captured image.

Subsequently, in step S404, the second vector determination section 346 determines, for each measurement point e, the position, in the camera coordinate system CS2, of the corresponding portion by referring to the position information d1. The approach in accordance with which the second vector determination section 346 determines the position, in the camera coordinate system CS2, of the corresponding portion for each measurement point e is the same as the approach in accordance with which the first vector determination section 345 determines the position, in the camera coordinate system CS2, of the corresponding portion for each measurement point e.

Subsequently, in step S405, the second vector determination section 346 generates second relationship information h2 representing the relationship between the position of the principal point of the projection lens 140 provided in the second projector 102 and the position of the first camera 210. The approach in accordance with which the second vector determination section 346 generates the second relationship information h2 is the same as the approach in accordance with which the first vector determination section 345 generates the first relationship information h1.

Subsequently, in step S406, the second vector determination section 346 determines the position, in the camera coordinate system CS2, of the principal point of the projection lens 140 provided in the second projector 102 based on the second relationship information h2. The approach in accordance with which the second vector determination section 346 determines the position, in the camera coordinate system CS2, of the principal point of the projection lens 140 provided in the second projector 102 based on the second relationship information h2 is the same as the approach in accordance with which the first vector determination section 345 determines the position, in the camera coordinate system CS2, of the principal point of the projection lens 140 provided in the first projector 101 based on the first relationship information h1.

Subsequently, in step S407, the second vector determination section 346 determines the second vector. The approach in accordance with which the second vector determination section 346 determines the second vector is the same as the approach in accordance with which the first vector determination section 345 determines the first vector. The second vector is, for example, a unit vector representing the direction from the position, in the camera coordinate system CS2, of the measured portion 2b to the position of the principal point, in the camera coordinate system CS2, of the projection lens 140 provided in the second projector 102.

Figure 17:
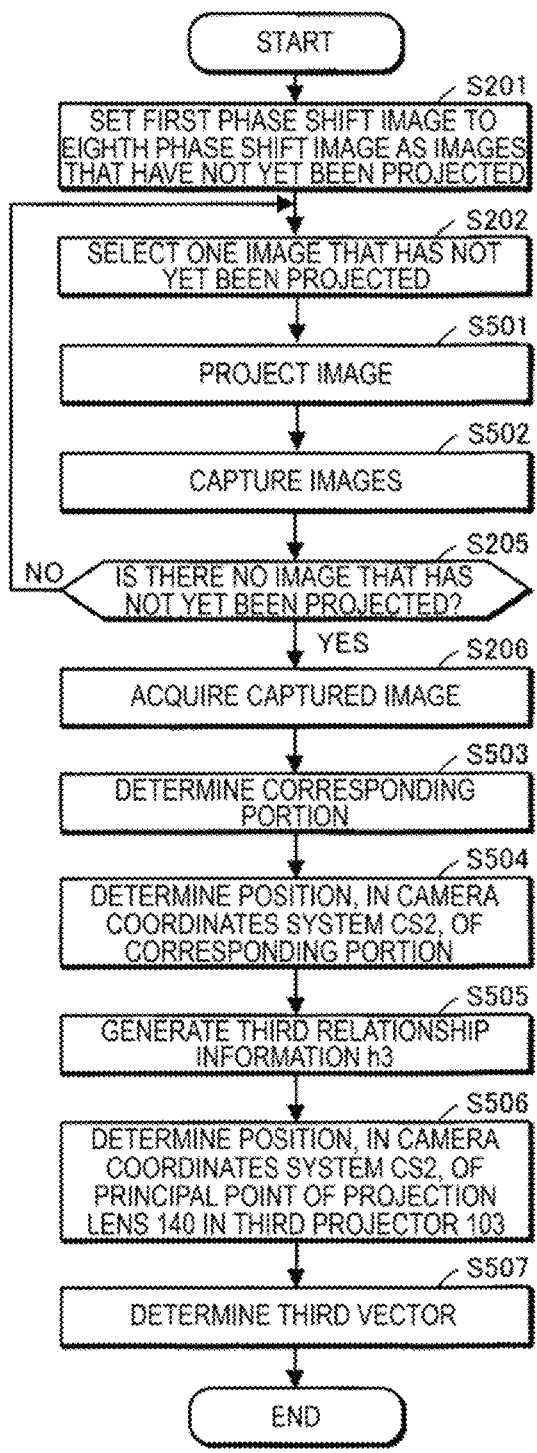
FIG. 17 shows an example of step S104 shown in FIG. 13.

FIG. 17 shows an example of step S104 shown in FIG. 13. In FIG. 17, the same processes as those shown in FIG. 14 have the same reference characters. The following description will be made primarily of the processes in FIG. 17 that differ from those shown in FIG. 14.

When steps S201 and S202 are completed, the projection controller 341 provides in step S501 the third projector 103 with the image data a representing the image selected in step S202. The projection controller 341 subsequently changes the setting of the image selected in step S202 from the image that has not yet been projected to the image that has been projected. The third projector 103 projects an image indicated by the image data a provided from the projection controller 341 onto the surface 2a.

Subsequently, in step S502, the camera controller 342 provides the imaging controller 241 of the measurement unit 200 with the second imaging instruction that instructs imaging using the first camera 210. In response to the second imaging instruction, the imaging controller 241 causes the first camera 210 to capture an image of the surface 2a onto which the image has been projected from the third projector 103. The first camera 210 captures an image of the surface 2a onto which the image has been projected from the third projector 103 to generate the first captured image data c1 representing the captured image. Steps S205 and S206 are subsequently executed.

Subsequently, in step S503, the third vector determination section 347 acquires from the acquisition section 343 the third captured image generated when the first camera 210 captures an image of the surface 2a in the situation in which the third projector 103 projects the pattern image G1 onto the surface 2a. The third vector determination section 347 subsequently determines the corresponding portion where the measurement point e is located from the plurality of portions 2b based on the pattern image G1 and the third captured image. The approach in accordance with which the third vector determination section 347 determines the corresponding portion where the measurement point e is located based on the pattern image G1 and the third captured image is the same as the approach in accordance with which the first vector determination section 345 determines the corresponding portion where the measurement point e is located based on the pattern image G1 and the first captured image.

Subsequently, in step S504, the third vector determination section 347 determines, for each measurement point e, the position, in the camera coordinate system CS2, of the corresponding portion by referring to the position information d1. The approach in accordance with which the third vector determination section 347 determines the position, in the camera coordinate system CS2, of the corresponding portion for each measurement point e is the same as the approach in accordance with which the first vector determination section 345 determines the position, in the camera coordinate system CS2, of the corresponding portion for each measurement point e.

Subsequently, in step S505, the third vector determination section 347 generates third relationship information h3 representing the relationship between the position of the principal point of the projection lens 140 provided in the third projector 103 and the position of the first camera 210. The approach in accordance with which the third vector determination section 347 generates the third relationship information h3 is the same as the approach in accordance with which the first vector determination section 345 generates the first relationship information h1.

Subsequently, in step S506, the third vector determination section 347 determines the position, in the camera coordinate system CS2, of the principal point of the projection lens 140 provided in the third projector 103 based on the third relationship information h3. The approach in accordance with which the third vector determination section 347 determines the position of the principal point, in the camera coordinate system CS2, of the projection lens 140 provided in the third projector 103 based on the third relationship information h3 is the same as the approach in accordance with which the first vector determination section 345 determines the position, in the camera coordinate system CS2, of the principal point of the projection lens 140 provided in the first projector 101 based on the first relationship information h1.

Subsequently, in step S507, the third vector determination section 347 determines the third vector. The approach in accordance with which the third vector determination section 347 determines the third vector is the same as the approach in accordance with which the first vector determination section 345 determines the first vector. The third vector is, for example, a unit vector representing the direction from the position, in the camera coordinate system CS2, of the measured portion 2b to the position, in the camera coordinate system CS2, of the principal point of the projection lens 140 provided in the third projector 103.

Figure 18:
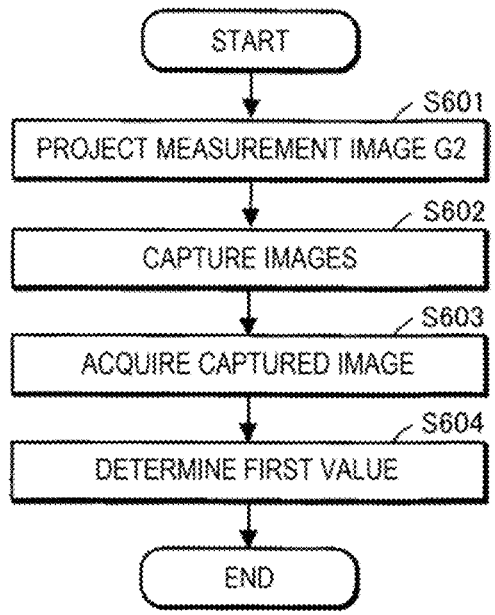
FIG. 18 shows an example of step S105 shown in FIG. 13.

FIG. 18 shows an example of step S105 shown in FIG. 13. In step S601, the projection controller 341 provides the first projector 101 with the image data a representing the measurement image G2, which is entirely white and has uniform luminance. The first projector 101 projects the measurement image G2 onto the surface 2a.

Subsequently, in step S602, the camera controller 342 provides the imaging controller 241 of the measurement unit 200 with the second imaging instruction that instructs imaging using the first camera 210. In response to the second imaging instruction, the imaging controller 241 causes the first camera 210 to capture an image of the surface 2a onto which the first projector 101 has projected the measurement image G2. The first camera 210 captures an image of the surface 2a onto which the first projector 101 has projected the measurement image G2 to generate the first captured image data c1 representing the captured image.

Subsequently, in step S603, the acquisition section 343 provides the provider 242 of the measurement unit 200 with a second provision instruction that instructs provision of a captured image associated with the measurement image G2. In response to the second provision instruction, the provider 242 provides the information processing apparatus 300 with the first captured image data c1 generated by imaging of the measurement image G2 projected by the first projector 101. The acquisition section 343 acquires the captured image generated in step S602 by acquiring the first captured image data c1 from the provider 242.

Subsequently, in step S604, the normal vector measurement section 348 determines the first value.

In step S604, the normal vector measurement section 348 first acquires from the acquisition section 343 as a first observed image a captured image generated when the first camera 210 captures an image of the surface 2a in the situation in which the first projector 101 projects the measurement image G2 onto the surface 2a.

The normal vector measurement section 348 subsequently determines the luminance value i1 provided from the cell 212p that observes the measured portion 2b as the first value of the measured portion 2b based on the first observed image.

Figure 19:
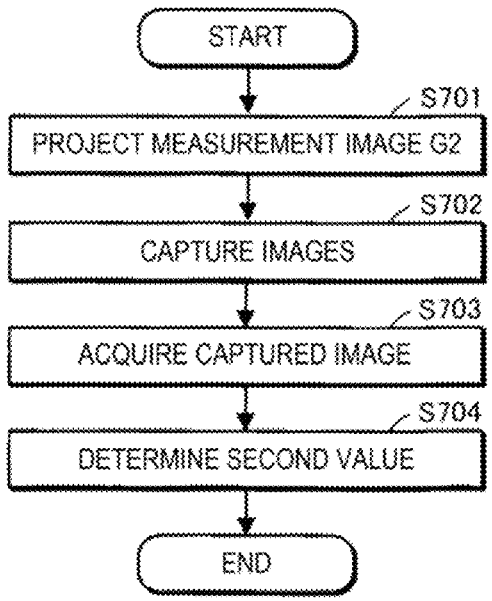
FIG. 19 shows an example of step S106 shown in FIG. 13.

FIG. 19 shows an example of step S106 shown in FIG. 13. In step S701, the projection controller 341 provides the second projector 102 with the image data a representing the measurement image G2, which is entirely white and has uniform luminance. The second projector 102 projects the measurement image G2 onto the surface 2a.

Subsequently, in step S702, the camera controller 342 provides the imaging controller 241 of the measurement unit 200 with the second imaging instruction that instructs imaging using the first camera 210. In response to the second imaging instruction, the imaging controller 241 causes the first camera 210 to capture an image of the surface 2a onto which the second projector 102 has projected the measurement image G2. The first camera 210 captures an image of the surface 2a onto which the second projector 102 has projected the measurement image G2 to generate the first captured image data c1 representing the captured image.

Subsequently, in step S703, the acquisition section 343 provides the provider 242 of the measurement unit 200 with the second provision instruction that instructs provision of a captured image associated with the measurement image G2. In response to the second provision instruction, the provider 242 provides the information processing apparatus 300 with the first captured image data c1 generated by imaging of the measurement image G2 projected by the second projector 102. The acquisition section 343 acquires the captured image generated in step S702 by acquiring the first captured image data c1 from the provider 242.

Subsequently, in step S704, the normal vector measurement section 348 determines the second value.

In step S704, the normal vector measurement section 348 first acquires from the acquisition section 343 as a second observed image a captured image generated when the first camera 210 captures an image of the surface 2a in the situation in which the second projector 102 projects the measurement image G2 onto the surface 2a.

The normal vector measurement section 348 subsequently determines the luminance value i2 provided from the cell 212p that observes the measured portion 2b as the second value of the measured portion 2b based on the second observed image.

Figure 20:
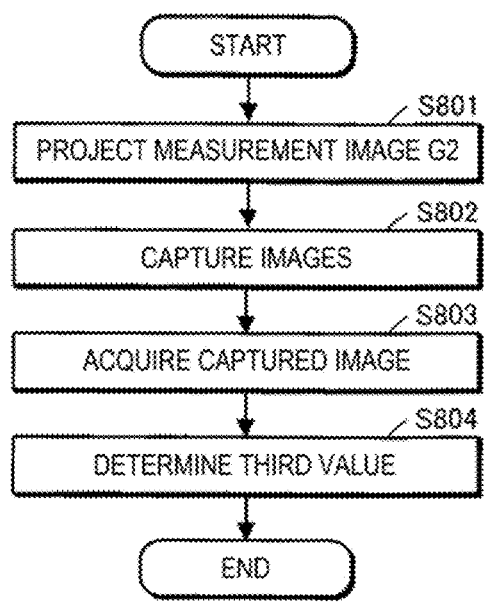
FIG. 20 shows an example of step S107 shown in FIG. 13.

FIG. 20 shows an example of step S107 shown in FIG. 13. In step S801, the projection controller 341 provides the third projector 103 with the image data a representing the measurement image G2, which is entirely white and has uniform luminance. The third projector 103 projects the measurement image G2 onto the surface 2a.

Subsequently, in step S802, the camera controller 342 provides the imaging controller 241 of the measurement unit 200 with the second imaging instruction that instructs imaging using the first camera 210. In response to the second imaging instruction, the imaging controller 241 causes the first camera 210 to capture an image of the surface 2a onto which the third projector 103 has projected the measurement image G2. The first camera 210 captures an image of the surface 2a onto which the third projector 103 has projected the measurement image G2 to generate the first captured image data c1 representing the captured image.

Subsequently, in step S803, the acquisition section 343 provides the provider 242 of the measurement unit 200 with the second provision instruction that instructs provision of a captured image associated with the measurement image G2. In response to the second provision instruction, the provider 242 provides the information processing apparatus 300 with the first captured image data c1 generated by imaging of the measurement image G2 projected by the third projector 103. The acquisition section 343 acquires the captured image generated in step S802 by acquiring the first captured image data c1 from the provider 242.

Subsequently, in step S804, the normal vector measurement section 348 determines the third value.

In step S804, the normal vector measurement section 348 first acquires from the acquisition section 343 as a third observed image a captured image generated when the first camera 210 captures an image of the surface 2a in the situation in which the third projector 103 projects the measurement image G2 onto the surface 2a.

The normal vector measurement section 348 subsequently determines the luminance value i3 provided from the cell 212p that observes the measured portion 2b as the third value of the measured portion 2b based on the third observed image.

Figure 21:
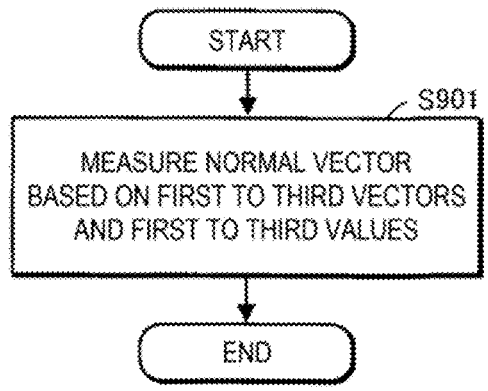
FIG. 21 shows an example of step S108 shown in FIG. 13.

FIG. 21 shows an example of step S108 shown in FIG. 13. In step S901, the normal vector measurement section 348 measures the normal vector of the measured portion 2b by applying the first to third vectors and the first to third values to Expression 2, which is N=S$^{-1}$ I.

A17: Overview of First Embodiment

The measurement method and the measurement system 1 according to the first embodiment include the following aspects.

The first vector determination section 345 determines the first vector based on the position information d1 representing the positions of the plurality of portions 2c at the surface 2a, the pattern image G1 projected onto the surface 2a by the first projector 101 via the projection lens 140, and the first captured image.

The surface 2a is an example of the target surface. The pattern image G1 projected by the first projector 101 onto the surface 2a via the projection lens 140 is an example of a first image. The first captured image is an image generated when the first camera 210 captures an image of the surface 2a in the situation in which the first projector 101 projects the pattern image G1 onto the surface 2a via the projection lens 140. The first vector is a vector representing the direction from the position of the measured portion 2b, which is one of the plurality of portions 2c, to the position of the principal point of the projection lens 140 of the first projector 101.

The second vector determination section 346 determines the second vector based on the position information d1, the pattern image G1 projected onto the surface 2a by the second projector 102 via the projection lens 140, and the second captured image.

The pattern image G1 projected by the second projector 102 onto the surface 2a via the projection lens 140 is an example of a second image. The second captured image is an image generated when the first camera 210 captures an image of the surface 2a in the situation in which the second projector 102 projects the pattern image G1 onto the surface 2a via the projection lens 140. The second vector is a vector representing the direction from the position of the measured portion 2b to the position of the principal point of the projection lens 140 of the second projector 102.

The third projector 103 determines the third vector based on the position information d1, the pattern image G1 projected onto the surface 2a by the third projector 103 via the projection lens 140, and the third captured image.

The pattern image G1 projected by the third projector 103 onto the surface 2a via the projection lens 140 is an example of a third image. The third captured image is an image generated when the first camera 210 captures an image of the surface 2a in the situation in which the third projector 103 projects the pattern image G1 onto the surface 2a via the projection lens 140. The third vector is a vector representing the direction from the position of the measured portion 2b to the position of the principal point of the projection lens 140 of the third projector 103.

The normal vector measurement section 348 measures the normal vector N to the measured portion 2b based on the first vector, the second vector, the third vector, the first value, the second value, and the third value.

The first value is a value representing the luminance of the measured portion 2b in the situation in which the first projector 101 projects the measurement image G2 onto the surface 2a via the projection lens 140. The measurement image G2 projected by the first projector 101 onto the surface 2a via the projection lens 140 is an example of a fourth image. The second value is a value representing the luminance of the measured portion 2b in the situation in which the second projector 102 projects the measurement image G2 onto the surface 2a via the projection lens 140. The measurement image G2 projected by the second projector 102 onto the surface 2a via the projection lens 140 is an example of a fifth image. The third value is a value representing the luminance of the measured portion 2b in the situation in which the third projector 103 projects the measurement image G2 onto the surface 2a via the projection lens 140. The measurement image G2 projected by the third projector 103 onto the surface 2a via the projection lens 140 is an example of a sixth image.

According to the aspect described above, the normal vector N to the measured portion 2b can be measured without adjusting the positions of all the first projector 101, the second projector 102, the third projector 103, and the first camera 210 in accordance with a predetermined positional relationship. Since the direction of the normal vector N to the measured portion 2b represents the shape of the measured portion 2b, a very small amount of strain and minute scratches at the measured portion 2b can be measured.

In the illuminance difference stereo method, a light source that outputs parallelized light is used in some cases. In contrast, the present aspect allows measurement of the normal vector N to the measured portion 2b without using a light source that outputs parallelized light. Furthermore, in the present aspect, it is not necessary to use a large light source that outputs light that covers the first projector 101, the second projector 102, and the third projector 103.

In the illuminance difference stereo method, the directions of the light source vectors are estimated in some cases by using a light source that outputs parallelized light, capturing an image of a sphere in advance to estimate the light source vectors, and analyzing the coordinates of the brightest point on the sphere. In contrast, the present aspect allows measurement of the normal vector N to the measured portion 2b without projecting parallelized light or measuring a sphere in advance.

The three-dimensional measurement section 344 generates the position information d1 based on the first captured image and a captured image generated when the second camera 220 captures an image of the surface 2a in the situation in which the first projector 101 projects the pattern image G1 onto the surface 2a via the projection lens 140.

According to the aspect described above, the position information d1 can be generated even when the positional relationship between the first projector 101 and the first camera 210 is not fixed.

The first vector determination section 345 determines the corresponding portion where the measurement point e is located from the plurality of portions 2c based on the pattern image G1 and the first captured image. The first vector determination section 345 determines the position, in the camera coordinate system CS2, of the corresponding portion by referring to the position information d1. The first vector determination section 345 generates the first relationship information h1, which represents the relationship between the position of the principal point of the projection lens 140 of the first projector 101 and the position of the first camera 210, based on the position, in the pattern image G1, of the measurement point e and the position, in the camera coordinate system CS2, of the corresponding portion. The first relationship information h1 is an example of relationship information. The first vector determination section 345 determines the position, in the camera coordinate system CS2, of the principal point of the projection lens 140 provided in the first projector 101 based on the first relationship information h1. The first vector determination section 345 determines as the first vector a vector representing the direction from the position, in the camera coordinate system CS2, of the measured portion 2*b* to the position, in the camera coordinate system CS2, of the principal point of the projection lens 140 provided in the first projector 101.

According to the aspect described above, the first vector can be determined by using the measurement point e located in the pattern image G1.

The normal vector measurement section 348 determines the first value based on a captured image generated when the first camera 210 captures an image of the surface 2*a* in the situation in which the first projector 101 projects the measurement image G2 onto the surface 2*a* via the projection lens 140.

According to the aspect described above, the first camera 210 used to determine the first vector can also be used to determine the first value.

B: Variations

Aspects of variations of the embodiment presented above by way of example will be presented below by way of example. Two or more aspects arbitrarily selected from those presented below by way of example may be combined with each other as appropriate to the extent that the aspects to be combined with each other do not contradict each other.

B1: First Variation

In the first embodiment, a set of the first phase shift image G11 to the fourth phase shift image G14 may be used as the measurement image G2. Any one of the first phase shift image G11 to the fourth phase shift image G14 is an example of the fourth image, an example of the fifth image, or an example of the sixth image.

The projection controller 341 causes the first projector 101 to project the set of the first phase shift image G11 to the fourth phase shift image G14 as the measurement image G2. The first phase shift image G11 projected as the measurement image G2 by the first projector 101 onto the surface 2*a* is an example of a first projection image. The second phase shift image G12 projected as the measurement image G2 by the first projector 101 onto the surface 2*a* is an example of a second projection image. The third phase shift image G13 projected as the measurement image G2 by the first projector 101 onto the surface 2*a* is an example of a third projection image. The fourth phase shift image G14 projected as the measurement image G2 by the first projector 101 onto the surface 2*a* is an example of a fourth projection image.

The camera controller 342 causes the first camera 210 to capture an image of the surface 2*a* in the situation in which the first projector 101 projects the first phase shift image G11 as the measurement image G2 onto the surface 2*a*. The captured image generated by the first camera 210 in the situation described above is referred to as a "fourth captured image".

The camera controller 342 causes the first camera 210 to capture an image of the surface 2*a* in the situation in which the first projector 101 projects the second phase shift image G12 as the measurement image G2 onto the surface 2*a*. The captured image generated by the first camera 210 in the situation described above is referred to as a "fifth captured image".

The camera controller 342 causes the first camera 210 to capture an image of the surface 2*a* in the situation in which the first projector 101 projects the third phase shift image G13 as the measurement image G2 onto the surface 2*a*. The captured image generated by the first camera 210 in the situation described above is referred to as a "sixth captured image".

The camera controller 342 causes the first camera 210 to capture an image of the surface 2*a* in the situation in which the first projector 101 projects the fourth phase shift image G14 as the measurement image G2 onto the surface 2*a*. The captured image generated by the first camera 210 in the situation described above is referred to as a "seventh captured image".

The normal vector measurement section 348 acquires the fourth, fifth, sixth, and seventh captured images via the acquisition section 343. The normal vector measurement section 348 determines the first value based on the fourth, fifth, sixth, and seventh captured images.

The luminance $I_1$ of the first phase shift image G11 observed by the cell 212*p* that captures an image of the measured portion 2*b*, the luminance $I_2$ of the second phase shift image G12 observed by the cell 212*p*, the luminance $I_3$ of the third phase shift image G13 observed by the cell 212*p*, and the luminance $I_4$ of the fourth phase shift image G14 observed by the cell 212*p* in the situation in which the first projector 101 projects the first phase shift image G11 to the fourth phase shift image G14 are expressed as follows.

$$I_1 = \{A \cdot \cos(\phi) + G\} \times R \qquad \text{Expression 6}$$

$$I_2 = \{A \cdot \cos(\phi - (\pi/2)) + G\} \times R \qquad \text{Expression 7}$$

$$I_3 = \{A \cdot \cos(\phi - \pi) + G\} \times R \qquad \text{Expression 8}$$

$$I_4 = \{A \cdot \cos(\phi - (3\pi/2)) + G\} \times R \qquad \text{Expression 9}$$

where

The parameter $\phi$ represents the phase of the sine wave in the phase shift image G10*a*.

The parameter A represents the amplitude of the luminance in the phase shift image G10*a*.

The parameter G represents the global ambient, which is a light component, such as ambient light.

The parameter R represents the reflectance of the measured portion 2*b*.

Expression 10 including the amplitude A, the reflectance R, and the luminance without including the global ambient G or the phase $\phi$ can be derived from Expressions 6 to 9.

$$2AR = \sqrt{J_0^2 + J_1^2} \qquad \text{Expression 10}$$

where $J_0^2 + J_1^2 = (2AR \cdot \cos \phi)^2 + (2AR \cdot \sin \phi)^2$, $\tan \phi = J_1/J_0$, $J_0 = I_1 - I_3 = 2AR \cdot \cos \phi$, and $J_1 = I_2 - I_4 = 2AR \cdot \sin \phi$.

When the reflectance of the measured portion 2*b* is fixed, the luminance indicated by the captured image generated by capturing an image of the phase shift image G10*a* is determined by the reflectance of the measured portion 2*b* based on the light source vectors and the normal vector, and the amplitude of the luminance of the phase shift image G10*a*. That is, when the reflectance of the measured portion 2*b* is fixed, the value of 2AR expressed by Expression 10 represents the luminance value i1, that is, the first value. The normal vector measurement section 348 therefore determines 2AR, which is calculated by using Expression 10, as the first value.

For example, the normal vector measurement section 348 uses the fourth captured image to determine the luminance $I_1$ of the measured portion 2b shown in the fourth captured image. The normal vector measurement section 348 uses the fifth captured image to determine the luminance $I_2$ of the measured portion 2b shown in the fifth captured image. The normal vector measurement section 348 uses the sixth captured image to determine the luminance $I_3$ of the measured portion 2b shown in the sixth captured image. The normal vector measurement section 348 uses the seventh captured image to determine the luminance $I_4$ of the measured portion 2b shown in the seventh captured image. The normal vector measurement section 348 determines 2AR as the first value by applying $I_1$ to $I_4$ to Expression 10.

The second and third values are determined in the same manner in which the first value is determined. To determine the second value, the second projector 102 projects the set of the first phase shift image G11 to the fourth phase shift image G14 as the measurement image G2 onto the surface 2a. To determine the third value, the third projector 103 projects the set of the first phase shift image G11 to the fourth phase shift image G14 as the measurement image G2 onto the surface 2a.

In place of the set of the first phase shift image G11 to the fourth phase shift image G14, the set of the fifth phase shift image G15 to the eighth phase shift image G18 may be used as the measurement image G2.

According to the first variation, an image different from the image having uniform luminance can be used as the measurement image G2. Furthermore, the effect of the ambient light on the first value can be reduced. The measurement less affected by the ambient light can therefore be performed.

An image used as the pattern image G1 can be used again as the measurement image G2.

The projection of the pattern image G1 can also be used as the projection of the measurement image G2. In this case, the imaging of the pattern image G1 is used as the imaging of the measurement image G2. The number of times of the image projection can therefore be reduced as compared with a configuration in which the projection of the pattern image G1 and the projection of the measurement image G2 are performed separately from each other. The number of times of the image capturing can further be reduced as compared with a configuration in which the imaging of the pattern image G1 and the imaging of the measurement image G2 are performed separately from each other.

It is noted that a phase shift image having three phases is not suitable for the first variation because neither the amplitude nor the reflectance thereof can be acquired.

B2: Second Variation

The values $I_1$ to $I_4$ shown in the first variation are each affected by the normal vector N to the measured portion 2b and the light source vectors s1 to s3. The fourth to seventh captured images used to determine $I_1$ to $I_4$, may therefore each have an area having relatively low luminance depending on the shape of the surface 2a. The change in luminance is caused by the influence of the normal vector N and the light source vectors s1 to s3, as described above, and is therefore necessary for the normal vector analysis in the illuminance difference stereo method. In a situation in which $I_1$ to $I_4$ are expressed, for example, by 8-bit integer values, which can achieve 256 grayscales, however, the resolution of $I_1$ to $I_4$ is likely to decrease in a relatively dark area.

In view of the fact described above, in the second variation, the area having relatively low luminance is determined in advance, and the amplitude A of the luminance of the phase shift image G10a projected in the area having relatively low luminance is increased. Furthermore, the effect of the increase in the amplitude A of the luminance of the phase shift image G10a on the value calculated by using Expression 10 described above is reduced.

In the second variation, the normal vector measurement section 348 determines the amplitude A of the luminance of the phase shift image G10a used as the measurement image G2 based on the captured image generated when the first camera 210 captures an image of the surface 2a in advance.

For example, before causing the first projector 101 to project the measurement image G2, the projection controller 341 causes the first projector 101 to project an image that is entirely white and has uniform luminance onto the surface 2a as a preliminary image. The preliminary image is not limited to an image that is entirely white and has uniform luminance and may instead, for example, be an image that is entirely cream in color and has uniform luminance.

The camera controller 342 subsequently causes the first camera 210 to generate a captured image by causing the first camera 210 to capture an image of the surface 2a in the situation in which the first projector 101 projects the preliminary image onto the surface 2a. The captured image generated when the first camera 210 captures an image of the surface 2a onto which the preliminary image has been projected is hereinafter referred to as a "first generated image". The first generated image is an example of a generated image.

Based on the first generated image, the normal vector measurement section 348 adjusts the luminance in the phase shift image G10a, which is used as the measurement image G2, in the phase shift image G10a. Adjusting the luminance in the phase shift image G10a in the phase shift image G10a means determining the luminance in each area of the phase shift image G10a.

For example, the normal vector measurement section 348 first determines the luminance of each of the portions 2c shown in the first generated image. In the first generated image, the area showing a first portion that is one of the portions 2c is an example of a first area. The luminance of the first area is an example of first luminance. In the first generated image, the area showing a second portion that differs from the first area and is one of the portions 2c is an example of a second area. The luminance of the second area is an example of second luminance. The normal vector measurement section 348 subsequently determines the highest luminance value out of the luminance values shown in the first generated image as a maximum luminance value.

The normal vector measurement section 348 subsequently determines an amplitude adjustment value for each of the cells 212p. For example, the normal vector measurement section 348 determines the amplitude adjustment value for each of the cells 212p by dividing the luminance value, shown in the first generated image, of the cell 212p by the maximum luminance value.

The normal vector measurement section 348 subsequently determines a first corresponding pair including the cell 212p for which the amplitude adjustment value has been determined from the plurality of first corresponding pairs. The normal vector measurement section 348 subsequently determines a pixel 130p corresponding to the determined first corresponding pair as a corresponding pixel.

The normal vector measurement section 348 subsequently changes the amplitude A of the luminance at the corresponding pixel to an adjusted amplitude A' based on the amplitude adjustment value at the cell 212p. For example, the normal vector measurement section 348 changes the amplitude A of the luminance at the corresponding pixel to the adjusted amplitude A' by multiplying the amplitude A by the reciprocal of the amplitude adjustment value.

The projection controller 341 subsequently causes the first projector 101 to project as the measurement image G2 the set of the first phase shift image G11 to the fourth phase shift image G14 having the adjusted amplitude A' to which the amplitude A has been changed for each of the pixels 130$p$.

An area that is relatively dark in the situation in which the amplitude A is employed can therefore be brighter than the brightness in the situation in which the amplitude A is employed. The resolution of $I_1$ to $I_4$ in the situation in which the adjusted amplitude A' is employed can therefore be higher than the resolution of $I_1$ to $I_4$ in the situation in which the amplitude A is employed.

The camera controller 342 causes the first camera 210 to generate the fourth to seventh captured images, as described above.

The normal vector measurement section 348 acquires the fourth, fifth, sixth, and seventh captured images via the acquisition section 343. The normal vector measurement section 348 determines the first value based on the fourth, fifth, sixth, and seventh captured images and the luminance shown in the first generated image.

Since the amplitude A is changed to the adjusted amplitude A', the value provided by applying $I_1$ to $I_4$ to Expression 10 is 2A'R instead of 2AR, which is the value to be originally provided. The normal vector measurement section 348 therefore corrects 2A'R to 2AR, which is the value to be originally provided.

For example, the normal vector measurement section 348 corrects 2A'R to 2AR by multiplying 2A'R by the amplitude adjustment value. The amplitude adjustment value is a value determined based on the first generated image. The normal vector measurement section 348 determines, as the first value, 2AR provided by correcting 2A'R. The thus determined 2AR allows reduction in the influence of the increase in the luminance of the phase shift image G10$a$. That is, the normal vector measurement section 348 can provide the value to be originally provided as the first value.

Furthermore, the second value may be determined in the same manner in which the first value is determined. To determine the second value, the second projector 102 is used in place of the first projector 101. Furthermore, before determining the adjusted amplitude A' for the second value, the normal vector measurement section 348 determines a second corresponding pair for each of the pixels 130$p$ of the second projector 102, the second corresponding pair formed of the pixel 130$p$ and the cell 212$p$ that observes the portion 2$c$ projected from the pixel 130$p$. For example, the normal vector measurement section 348 determines the second corresponding pair by using the phase shift method based on the first phase shift image G11 and the four captured images used to determine the second vector. The normal vector measurement section 348 uses the second corresponding pair in place of the first corresponding pair to determine the second value in the same manner in which the first value is determined.

The third value may be determined in the same manner in which the first value is determined. To determine the third value, the third projector 103 is used in place of the first projector 101. Furthermore, before determining the adjusted amplitude A' for the third value, the normal vector measurement section 348 determines a third corresponding pair for each of the pixels 130$p$ of the third projector 103, the third corresponding pair formed of the pixel 130$p$ and the cell 212$p$ that observes the portion 2$c$ projected from the pixel 130$p$. For example, the normal vector measurement section 348 determines the third corresponding pair by using the phase shift method based on the first phase shift image G11 and the four captured images used to determine the third vector. The normal vector measurement section 348 uses the third corresponding pair in place of the first corresponding pair to determine the third value in the same manner in which the first value is determined.

In the second variation, based on the first generated image generated when the first camera 210 captures an image of the surface 2$a$ in the situation in which the first projector 101 projects the preliminary image onto the surface 2$a$ via the projection lens 140, the normal vector measurement section 348 determines the first luminance of the first area in the first generated image and the second luminance of the second area in the first generated image. The normal vector measurement section 348 determines the luminance of the area, in the first phase shift image G11, corresponding to the first area based on the first luminance. The normal vector measurement section 348 determines the luminance of the area, in the first phase shift image G11, corresponding to the second area based on the second luminance. The normal vector measurement section 348 determines the luminance of the area, in the second phase shift image G12, corresponding to the first area based on the first luminance. The normal vector measurement section 348 determines the luminance of the area, in the second phase shift image G12, corresponding to the second area based on the second luminance. The normal vector measurement section 348 determines the luminance of the area, in the third phase shift image G13, corresponding to the first area based on the first luminance. The normal vector measurement section 348 determines the luminance of the area, in the third phase shift image G13, corresponding to the second area based on the second luminance. The normal vector measurement section 348 determines the luminance of the area, in the fourth phase shift image G14, corresponding to the first area based on the first luminance. The normal vector measurement section 348 determines the luminance of the area, in the fourth phase shift image G14, corresponding to the second area based on the second luminance. According to the aspect described above, the resolution of $I_1$ to $I_4$ can be increased.

In the second variation, the normal vector measurement section 348 determines the first value based on the fourth, fifth, sixth, and seventh captured images, the first luminance, and the second luminance. According to the aspect described above, a decrease in the accuracy of the first value can be suppressed with the resolution of $I_1$ to $I_4$ increased.

In the second variation, the projector 100 is used in place of a light source that outputs parallelized light. In an image projected from the projector 100, an edge portion of the image tends to be darker than a central portion of the image. The second variation is therefore particularly effective in the configuration in which the projector 100 is used in place of a light source that outputs parallelized light.

B3: Third Variation

In the first embodiment and the first and second variants, the second camera 220 may be omitted. In this case, the positional relationship between the first projector 101 and the first camera 210 is calculated in advance.

When the positional relationship between the first projector 101 and the first camera 210 is calculated in advance, the three-dimensional measurement section 344 generates the position information d1 based on the first captured image generated when the first camera 210 captures an image of the surface 2$a$ in the situation in which the first projector 101 projects the pattern image G1 onto the surface 2$a$ via the projection lens 140, and the pattern image G1. For example, the set of the first phase shift image G11 to the fourth phase shift image G14 or the set of the fifth phase shift image G15 to the eighth phase shift image G18 is used as the as the pattern image G1. In this case, the three-dimensional measurement section 344 generates the position information d1 by using the phase shift method.

The fact that the positional relationship between the first projector 101 and the first camera 210 has been calculated in advance means that the first relationship information h1 has been calculated in advance. The first vector determination section 345 can therefore omit the process of calculating the first relationship information h1.

According to the third variation, the normal vector N to the measured portion 2b can be measured without adjusting the positions of all the first projector 101, the second projector 102, the third projector 103, and the first camera 210 even when the single-lens first camera 210 is used in place of the stereo camera including the first camera 210 and the second camera 220. Furthermore, the normal vector N to the measured portion 2b can be measured without projecting parallelized light or measuring a sphere in advance.

B4: Fourth Variation

In the first embodiment and the first to third variations, the normal vector of the measured portion 2b may be measured by using four or more projectors 100, as in a typical illuminance difference stereo method. For example, when the surface 2a has a specular reflection component, such as a metallic component, it is effective to measure the normal vector of the measured portion 2b by using four projectors 100.

B5: Fifth Variation

In the first embodiment and the first to fourth variations, the measured portion 2b is not limited to one of the plurality of portions 2c and may, for example, be each of two or more of the plurality of portions 2c.

B6: Sixth Variation

In the first embodiment and the first to fifth variations, the information processing apparatus 300 may be incorporated into the projector 100 or the measurement unit 200.

B7: Seventh Variation

In the first embodiment and the first to sixth variations, the liquid crystal light valve 130 is used as an example of the light modulator. The light modulator is, however, not limited to a liquid crystal light valve and can be changed as appropriate. For example, the light modulator may be configured to use one digital mirror device or may be configured based on another scheme. In place of a liquid crystal panel or a DMD, a configuration capable of modulating the light outputted from the light source 120 is employable as the light modulator.

B8: Eighth Variation

In the first embodiment and the first to seventh variations, the measurement system 1 can be used in at least one of a surface strain measurement instrument, a surface defect inspection apparatus, and a three-dimensional shape measurement instrument. The measurement system 1 can also be used, for example, in the measurement field in general and the robotics field.

B9: Ninth Variation

In the first embodiment and the first to eighth variations, the first phase shift image G11 to the eighth phase shift image G18 may each be a phase shift image having luminance that changes in accordance with a sine wave having two or more cycles. In this case, a phase coupling process is added.

What is claimed is:

1. A measurement method comprising:
   determining a first vector representing a direction from a position of a measured portion that is one of a plurality of portions of a target surface to a position of a principal point of a first lens based on position information representing positions of the plurality of portions, a first image, and a first captured image generated when a first camera captures an image of the target surface in a situation in which a first projector projects the first image onto the target surface via the first lens;
   determining a second vector representing a direction from the position of the measured portion to a position of a principal point of a second lens based on the position information, a second image, and a second captured image generated when the first camera captures an image of the target surface in a situation in which a second projector projects the second image onto the target surface via the second lens;
   determining a third vector representing a direction from the position of the measured portion to a position of a principal point of a third lens based on the position information, a third image, and a third captured image generated when the first camera captures an image of the target surface in a situation in which a third projector projects the third image onto the target surface via the third lens; and
   measuring a normal vector of the measured portion based on the first vector, the second vector, the third vector, a first value representing luminance of the measured portion in a situation in which the first projector projects a fourth image onto the target surface via the first lens, a second value representing the luminance of the measured portion in a situation in which the second projector projects a fifth image onto the target surface via the second lens, and a third value representing the luminance of the measured portion in a situation in which the third projector projects a sixth image onto the target surface via the third lens.

2. The measurement method according to claim 1, further comprising
   generating the position information based on the first captured image and an image generated when a second camera captures an image of the target surface in the situation in which the first projector projects the first image onto the target surface via the first lens.

3. The measurement method according to claim 1, further comprising
   generating the position information based on the first image and the first captured image.

4. The measurement method according to claim 1,
   wherein the position information represents the positions of the plurality of portions in a camera coordinate system,
   the camera coordinate system is a three-dimensional coordinate system based on a position of the first camera,
   the first image includes a specific point, and
   determining the first vector includes
      determining a corresponding portion where the specific point is located in the plurality of portions based on the first image and the first captured image,
      determining a position of the corresponding portion in the camera coordinate system by referring to the position information,
      generating relationship information representing a relationship between the position of the principal point of the first lens and the position of the first camera based on the position of the specific point in the first image and the position of the corresponding portion in the camera coordinate system, determining the position of the principal point of the first lens in the camera coordinate system based on the relationship information, and determining as the first vector a vector representing the direction from the position of the measured portion in the camera coordinate system to the position of the principal point of the first lens in the camera coordinate system.

5. The measurement method according to claim 1, further comprising determining the first value based on a captured image generated when the first camera captures an image of the target surface in the situation in which the first projector projects the fourth image onto the target surface via the first lens.

6. The measurement method according to claim 1, wherein the fourth image is a first projection image, the first projection image, a second projection image, a third projection image, and a fourth projection image each show a pattern of luminance that changes in a predetermined direction in accordance with a sine wave, a phase of the sine wave in the second projection image is π/2 ahead of the phase of the sine wave in the first projection image, the phase of the sine wave in the third projection image is π/2 ahead of the phase of the sine wave in the second projection image, and the phase of the sine wave in the fourth projection image is π/2 ahead of the phase of the sine wave in the third projection image, the method further comprising determining the first value based on a fourth captured image generated when the first camera captures an image of the target surface in a situation in which the first projector projects the first projection image onto the target surface via the first lens, a fifth captured image generated when the first camera captures an image of the target surface in a situation in which the first projector projects the second projection image onto the target surface via the first lens, a sixth captured image generated when the first camera captures an image of the target surface in a situation in which the first projector projects the third projection image onto the target surface via the first lens, and a seventh captured image generated when the first camera captures an image of the target surface in a situation in which the first projector projects the fourth projection image onto the target surface via the first lens.

7. The measurement method according to claim 6, further comprising determining first luminance of a first area of a generated image and second luminance of a second area of the generated image based on the generated image generated when the first camera captures an image of the target surface in a situation in which the first projector projects an image onto the target surface via the first lens, determining luminance of an area corresponding to the first area in the first projection image based on the first luminance, determining luminance of an area corresponding to the second area in the first projection image based on the second luminance, determining the luminance of the area corresponding to the first area in the second projection image based on the first luminance, determining the luminance of the area corresponding to the second area in the second projection image based on the second luminance, determining the luminance of the area corresponding to the first area in the third projection image based on the first luminance, determining the luminance of the area corresponding to the second area in the third projection image based on the second luminance, determining the luminance of the area corresponding to the first area in the fourth projection image based on the first luminance, and determining the luminance of the area corresponding to the second area in the fourth projection image based on the second luminance.

8. The measurement method according to claim 7, wherein determining the first value includes determining the first value based on the fourth captured image, fifth captured image, sixth captured image, and seventh captured image, the first luminance, and the second luminance.

9. A measurement system comprising:

a first projector;

a second projector;

a third projector;

a first camera; and one or more processors programmed to generate position information representing positions of a plurality of portions of a target surface based on a first image and a first captured image generated when the first camera captures an image of the target surface in a situation in which the first projector projects the first image onto the target surface via a first lens, determine a first vector representing a direction from a position of a measured portion that is one of the plurality of portions to a position of a principal point of the first lens based on the position information, the first image, and the first captured image, determine a second vector representing a direction from the position of the measured portion to a position of a principal point of a second lens based on the position information, a second image, and a second captured image generated when the first camera captures an image of the target surface in a situation in which the second projector projects the second image onto the target surface via the second lens, determine a third vector representing a direction from the position of the measured portion to a position of a principal point of a third lens based on the position information, a third image, and a third captured image generated when the first camera captures an image of the target surface in a situation in which the third projector projects the third image onto the target surface via the third lens, and measure a normal vector of the measured portion based on the first vector, the second vector, the third vector, a first value representing luminance of the measured portion in a situation in which the first projector projects a fourth image onto the target surface via the first lens, a second value representing the luminance of the measured portion in a situation in which the second projector projects a fifth image onto the target surface via the second lens, and a third value representing the luminance of the measured portion in a situation in which the third projector projects a sixth image onto the target surface via the third lens.

10. A measurement system comprising:
a first projector;
a second projector;
a third projector;
a first camera;
a second camera; and
one or more processors programmed to,
  generate position information representing positions of a plurality of portions of a target surface based on a first captured image generated when the first camera captures an image of the target surface in a situation in which the first projector projects a first image onto the target surface via a first lens and an image generated when the second camera captures an image of the target surface in the situation in which the first projector projects the first image onto the target surface via the first lens,
  determine a first vector representing a direction from a position of a measured portion that is one of the plurality of portions to a position of a principal point of the first lens based on the position information, the first image, and the first captured image,
  determine a second vector representing a direction from the position of the measured portion to a position of a principal point of a second lens based on the position information, a second image, and a second captured image generated when the first camera captures an image of the target surface in a situation in which the second projector projects the second image onto the target surface via the second lens,
  determine a third vector representing a direction from the position of the measured portion to a position of a principal point of a third lens based on the position information, a third image, and a third captured image generated when the first camera captures an image of the target surface in a situation in which the third projector projects the third image onto the target surface via the third lens, and
  measure a normal vector of the measured portion based on the first vector, the second vector, the third vector, a first value representing luminance of the measured portion in a situation in which the first projector projects a fourth image onto the target surface via the first lens, a second value representing the luminance of the measured portion in a situation in which the second projector projects a fifth image onto the target surface via the second lens, and a third value representing the luminance of the measured portion in a situation in which the third projector projects a sixth image onto the target surface via the third lens.

* * * * *